(12) United States Patent
Delsol et al.

(10) Patent No.: US 12,212,548 B2
(45) Date of Patent: *Jan. 28, 2025

(54) CORE NETWORK, USER EQUIPMENT, AND COMMUNICATION CONTROL METHOD FOR DEVICE TO DEVICE COMMUNICATION

(71) Applicant: NEC Corporation, Tokyo (JP)

(72) Inventors: Thomas Delsol, Berkshire (GB); Caroline Jactat, Berkshire (GB)

(73) Assignee: NEC CORPORATION, Tokyo (JP)

( * ) Notice: Subject to any disclaimer, the term of this patent is extended or adjusted under 35 U.S.C. 154(b) by 101 days.

This patent is subject to a terminal disclaimer.

(21) Appl. No.: 17/204,639

(22) Filed: Mar. 17, 2021

(65) Prior Publication Data
US 2021/0203647 A1 Jul. 1, 2021

Related U.S. Application Data

(63) Continuation of application No. 16/552,363, filed on Aug. 27, 2019, now Pat. No. 10,992,655, which is a
(Continued)

(30) Foreign Application Priority Data

Mar. 30, 2012 (GB) ..................................... 1205803

(51) Int. Cl.
*H04L 9/40* (2022.01)
*H04W 12/041* (2021.01)
*H04W 76/14* (2018.01)

(52) U.S. Cl.
CPC ............ *H04L 63/062* (2013.01); *H04L 63/20* (2013.01); *H04L 63/205* (2013.01); *H04W 12/041* (2021.01); *H04W 76/14* (2018.02)

(58) Field of Classification Search
CPC ..... H04L 63/062; H04L 63/20; H04L 63/205; H04W 12/041; H04W 76/14; H04W 12/04
See application file for complete search history.

(56) References Cited

U.S. PATENT DOCUMENTS 5,943,425 A * 8/1999 Mizikovsky .......... H04W 8/265
455/418
6,868,160 B1 * 3/2005 Raji ...................... H04L 9/3247
380/282

(Continued)

FOREIGN PATENT DOCUMENTS

JP 2005110135 A 4/2005
JP 200530449 A 10/2005
(Continued)

OTHER PUBLICATIONS

3GPP, "3rd Generation Partnership Project Technical Specification Group Services and System Aspects; General Packet Radio Service (GPRS) enhancements for Evolved Universal Terrestrial Radio Access Network (E-UTRAN) access (Release 11)", Technical Specification, 3GPP TS 23.401, V11.1.0, Mar. 2012. Cited in the Applicants Specification on p. 10.
(Continued)

*Primary Examiner* — Aravind K Moorthy
(74) *Attorney, Agent, or Firm* — Sughrue Mion, PLLC

(57) ABSTRACT

A communications system is provided. A network device controls the setting up of a device to device communication link, as sent between a device in the core network and the base station(s) servicing the relevant mobile devices, including disclosure of the common security information for two mobile devices to communicate securely over the direct device to device communications link.

6 Claims, 9 Drawing Sheets

Related U.S. Application Data continuation of application No. 15/840,431, filed on Dec. 13, 2017, now abandoned, which is a continuation of application No. 14/387,822, filed as application No. PCT/JP2013/054640 on Feb. 18, 2013, now Pat. No. 9,876,821.

(56) References Cited

U.S. PATENT DOCUMENTS

| | | | | |
|---|---|---|---|---|
| 7,099,946 | B2* | 8/2006 | Lennon | G06V 20/30 |
| | | | | 709/227 |
| 7,143,169 | B1* | 11/2006 | Champagne | H04L 69/161 |
| | | | | 709/227 |
| 7,234,058 | B1* | 6/2007 | Baugher | H04L 9/0833 |
| | | | | 713/168 |
| 7,430,755 | B1* | 9/2008 | Hughes | H04L 9/3263 |
| | | | | 726/4 |
| 7,529,785 | B1* | 5/2009 | Spertus | G06F 11/1453 |
| 7,535,856 | B2* | 5/2009 | Booth, III | H04L 41/0886 |
| | | | | 370/395.2 |
| 7,551,915 | B1* | 6/2009 | Manning | H04L 9/3242 |
| | | | | 713/172 |
| 7,594,262 | B2* | 9/2009 | Hanzlik | H04L 63/20 |
| | | | | 380/278 |
| 7,596,690 | B2* | 9/2009 | Singh | H04L 9/083 |
| | | | | 713/169 |
| 7,774,411 | B2* | 8/2010 | LeMay | H04L 51/00 |
| | | | | 709/206 |
| 7,861,081 | B2* | 12/2010 | Yeap | H04W 12/06 |
| | | | | 713/185 |
| 7,904,952 | B2* | 3/2011 | Yeap | H04W 12/084 |
| | | | | 726/10 |
| 8,086,698 | B2* | 12/2011 | Rakowski | H04L 41/0803 |
| | | | | 709/219 |
| 8,156,536 | B2* | 4/2012 | Polk | H04L 63/0428 |
| | | | | 713/153 |
| 8,166,296 | B2* | 4/2012 | Buer | H04W 12/069 |
| | | | | 713/168 |
| 8,230,517 | B2* | 7/2012 | Karamchedu | H04L 51/224 |
| | | | | 713/165 |
| 8,346,939 | B2* | 1/2013 | Tomita | H04L 63/061 |
| | | | | 709/227 |
| 8,412,157 | B2 | 4/2013 | Wang | |
| 8,504,449 | B2* | 8/2013 | Brown | H04L 63/08 |
| | | | | 709/219 |
| 8,548,172 | B2* | 10/2013 | Kerschbaum | H04L 63/062 |
| | | | | 713/168 |
| 8,615,651 | B1* | 12/2013 | Modadugu | H04L 9/3228 |
| | | | | 713/168 |
| 8,619,986 | B2* | 12/2013 | Drucker | H04L 9/0866 |
| | | | | 380/255 |
| 8,661,252 | B2* | 2/2014 | Chandwani | H04L 61/5092 |
| | | | | 713/168 |
| 8,694,783 | B2* | 4/2014 | Fahn | H04L 9/083 |
| | | | | 713/169 |
| 8,775,797 | B2* | 7/2014 | Layson | G06F 21/125 |
| | | | | 726/16 |
| 8,776,209 | B1* | 7/2014 | Kumar | H04L 63/0815 |
| | | | | 709/225 |
| 8,782,393 | B1* | 7/2014 | Rothstein | H04L 63/0281 |
| | | | | 726/13 |
| 8,788,802 | B2* | 7/2014 | Gantman | H04L 9/088 |
| | | | | 713/168 |
| 8,856,910 | B1* | 10/2014 | Rostami-Hesarsorkh | |
| | | | | H04L 63/1408 |
| | | | | 713/168 |
| 8,885,830 | B2* | 11/2014 | Tahan | H04L 63/065 |
| | | | | 380/278 |
| 8,898,482 | B2* | 11/2014 | Templin | H04L 63/062 |
| | | | | 713/193 |
| 9,094,208 | B2* | 7/2015 | Plewnia | H04L 9/3213 |
| 9,106,628 | B2* | 8/2015 | Kolesnikov | H04L 65/1045 |
| 9,178,696 | B2* | 11/2015 | Blom | H04L 9/0861 |
| 9,198,162 | B2* | 11/2015 | Van Phan | H04W 72/12 |
| 9,305,173 | B2* | 4/2016 | Cronce | H04L 9/0838 |
| 9,479,930 | B2* | 10/2016 | Takahashi | H04B 7/155 |
| 9,525,999 | B2* | 12/2016 | Godfrey | H04L 9/083 |
| 9,667,713 | B2* | 5/2017 | Vyrros | H04L 67/55 |
| 9,742,560 | B2* | 8/2017 | Simon | H04L 63/064 |
| 9,755,825 | B2* | 9/2017 | O'Brien | H04L 63/061 |
| 9,876,821 | B2* | 1/2018 | Delsol | H04L 63/205 |
| 9,878,821 | B2 | 1/2018 | Delsol et al. | |
| 10,992,655 | B2* | 4/2021 | Delsol | H04W 12/041 |
| 2001/0047474 | A1* | 11/2001 | Takagi | H04L 63/04 |
| | | | | 713/153 |
| 2002/0197979 | A1 | 12/2002 | Vanderveen | |
| 2003/0014646 | A1* | 1/2003 | Buddhikot | H04L 63/162 |
| | | | | 713/184 |
| 2003/0021418 | A1* | 1/2003 | Arakawa | H04L 9/0891 |
| | | | | 380/277 |
| 2003/0026432 | A1* | 2/2003 | Woodward | H04L 9/085 |
| | | | | 380/278 |
| 2003/0044020 | A1 | 3/2003 | Aboba et al. | |
| 2003/0051140 | A1* | 3/2003 | Buddhikot | H04L 9/0838 |
| | | | | 713/169 |
| 2003/0120928 | A1* | 6/2003 | Cato | H04L 63/0428 |
| | | | | 713/193 |
| 2003/0126429 | A1* | 7/2003 | Jinmei | H04L 63/20 |
| | | | | 713/153 |
| 2003/0177186 | A1* | 9/2003 | Goodman | H04L 69/329 |
| | | | | 709/205 |
| 2003/0191937 | A1* | 10/2003 | Balissat | H04L 63/08 |
| | | | | 713/163 |
| 2004/0032950 | A1* | 2/2004 | Graunke | H04L 9/065 |
| | | | | 380/42 |
| 2004/0034776 | A1* | 2/2004 | Fernando | H04L 9/321 |
| | | | | 713/171 |
| 2004/0073786 | A1* | 4/2004 | O'Neill | H04W 12/06 |
| | | | | 726/3 |
| 2004/0229595 | A1* | 11/2004 | Laursen | H04L 67/04 |
| | | | | 455/403 |
| 2005/0003822 | A1 | 1/2005 | Aholainen et al. | |
| 2005/0050322 | A1* | 3/2005 | Mizrah | H04L 63/08 |
| | | | | 713/168 |
| 2005/0060547 | A1* | 3/2005 | Saito | H04L 12/40091 |
| | | | | 713/171 |
| 2005/0117747 | A1* | 6/2005 | Valenti | H04L 9/0827 |
| | | | | 380/44 |
| 2005/0132204 | A1* | 6/2005 | Gouguenheim | G06F 21/10 |
| | | | | 713/193 |
| 2005/0259673 | A1* | 11/2005 | Lu | H04W 92/08 |
| | | | | 370/419 |
| 2005/0273843 | A1* | 12/2005 | Shigeeda | H04L 63/0807 |
| | | | | 726/5 |
| 2006/0038660 | A1* | 2/2006 | Doumuki | H04K 1/00 |
| | | | | 380/42 |
| 2006/0062391 | A1* | 3/2006 | Lee | H04L 9/0866 |
| | | | | 380/270 |
| 2006/0072569 | A1* | 4/2006 | Eppinger | H04L 61/00 |
| | | | | 370/389 |
| 2006/0101009 | A1* | 5/2006 | Weber | G06F 16/14 |
| 2006/0218015 | A1* | 9/2006 | Walker | A61J 7/0481 |
| | | | | 455/132 |
| 2007/0064935 | A1* | 3/2007 | Ben-Yehuda | H04L 63/06 |
| | | | | 380/44 |
| 2007/0086591 | A1* | 4/2007 | Blom | H04W 12/04 |
| | | | | 380/279 |
| 2007/0097934 | A1 | 5/2007 | Walker et al. | |
| 2007/0106895 | A1* | 5/2007 | Huang | H04L 9/3247 |
| | | | | 713/181 |
| 2007/0143594 | A1* | 6/2007 | Yang-Talpin | G11B 20/00086 |
| 2007/0220589 | A1* | 9/2007 | Salowey | H04L 63/08 |
| | | | | 726/2 |
| 2007/0230707 | A1* | 10/2007 | Blom | H04L 9/0844 |
| | | | | 380/277 |
| 2007/0266236 | A1* | 11/2007 | Colditz | H04L 63/105 |
| | | | | 713/153 |
| 2007/0286100 | A1* | 12/2007 | Saaranen | H04L 67/1068 |
| | | | | 370/260 |

(56) References Cited

U.S. PATENT DOCUMENTS

| | | | |
|---|---|---|---|
| 2008/0022374 A1* | 1/2008 | Brown | H04L 63/0823 726/5 |
| 2008/0037785 A1* | 2/2008 | Gantman | H04L 9/0872 380/278 |
| 2008/0059792 A1* | 3/2008 | Feder | H04W 12/041 380/270 |
| 2008/0075088 A1* | 3/2008 | Carrasco | H04L 12/4641 370/395.5 |
| 2008/0095373 A1* | 4/2008 | Nagata | H04L 9/0827 380/278 |
| 2008/0096530 A1* | 4/2008 | Kuo | H04W 12/02 455/411 |
| 2008/0120707 A1* | 5/2008 | Ramia | H04L 63/0861 726/5 |
| 2008/0127327 A1* | 5/2008 | Carrasco | H04L 63/20 726/15 |
| 2008/0137859 A1* | 6/2008 | Jagadeesan | H04L 63/062 380/258 |
| 2008/0162924 A1 | 7/2008 | Chinitz et al. | |
| 2008/0192739 A1* | 8/2008 | Carrasco | H04L 45/00 370/389 |
| 2008/0205291 A1* | 8/2008 | Li | H04L 47/70 370/254 |
| 2008/0209560 A1* | 8/2008 | Dapp | H04L 63/1416 726/23 |
| 2008/0244271 A1* | 10/2008 | Yu | H04L 63/0492 713/176 |
| 2008/0267395 A1* | 10/2008 | Deishi | H04L 63/065 380/44 |
| 2008/0298589 A1* | 12/2008 | Katar | H04L 45/16 380/278 |
| 2009/0044022 A1* | 2/2009 | Singh | G07C 9/27 713/182 |
| 2009/0119506 A1* | 5/2009 | Allen | H04L 9/3271 380/283 |
| 2009/0138715 A1* | 5/2009 | Xiao | H04L 9/0838 713/171 |
| 2009/0158039 A1* | 6/2009 | Prasad | H04L 9/0844 713/168 |
| 2009/0210697 A1* | 8/2009 | Chen | H04L 67/104 713/153 |
| 2009/0235339 A1* | 9/2009 | Mennes | H04L 9/3273 726/5 |
| 2009/0254626 A1* | 10/2009 | Ahtisaari | H04W 12/08 709/225 |
| 2009/0271626 A1 | 10/2009 | Wang | |
| 2009/0327730 A1* | 12/2009 | Deishi | H04L 63/0435 713/171 |
| 2010/0009675 A1 | 1/2010 | Wijting et al. | |
| 2010/0024022 A1* | 1/2010 | Wells | H04W 12/069 726/7 |
| 2010/0045442 A1* | 2/2010 | Lu | H04L 9/3271 713/168 |
| 2010/0049975 A1* | 2/2010 | Parno | H04L 63/1483 713/168 |
| 2010/0100964 A1* | 4/2010 | Mahaffey | G06F 21/577 726/25 |
| 2010/0138660 A1* | 6/2010 | Haynes | H04L 63/061 713/171 |
| 2010/0153709 A1* | 6/2010 | Thomas | H04L 9/0866 713/171 |
| 2010/0153727 A1* | 6/2010 | Reznik | H04L 9/0841 713/171 |
| 2010/0162366 A1* | 6/2010 | Jin | G06F 21/57 726/4 |
| 2010/0262828 A1* | 10/2010 | Brown | H04L 9/08 713/171 |
| 2010/0272260 A1* | 10/2010 | Cao | H04H 60/15 380/46 |
| 2010/0278108 A1* | 11/2010 | Cho | H04L 12/4633 370/328 |
| 2010/0293379 A1* | 11/2010 | Nie | H04L 9/3242 713/169 |
| 2010/0325423 A1* | 12/2010 | Etchegoyen | H04L 63/0428 713/153 |
| 2011/0072488 A1 | 3/2011 | Bi et al. | |
| 2011/0078445 A1* | 3/2011 | Xiao | H04L 63/105 455/41.3 |
| 2011/0153634 A1* | 6/2011 | Chu | H04L 67/104 707/E17.001 |
| 2011/0154041 A1* | 6/2011 | Godfrey | H04W 12/033 713/171 |
| 2011/0167272 A1* | 7/2011 | Kolesnikov | H04L 9/3271 713/171 |
| 2011/0182426 A1* | 7/2011 | Roosta | H04L 9/0833 380/255 |
| 2011/0222691 A1* | 9/2011 | Yamaguchi | G06F 21/10 380/278 |
| 2011/0252231 A1* | 10/2011 | Mishra | H04L 63/061 713/160 |
| 2011/0258322 A1* | 10/2011 | Luzzatti | H04L 47/765 709/227 |
| 2011/0258327 A1 | 10/2011 | Phan | H04W 16/10 709/227 |
| 2011/0258445 A1* | 10/2011 | Escott | H04W 12/0431 713/168 |
| 2011/0274276 A1* | 11/2011 | Xu | H04W 12/0431 380/278 |
| 2011/0282989 A1* | 11/2011 | Geirhofer | H04W 72/53 709/227 |
| 2011/0296185 A1* | 12/2011 | Kamarthy | H04L 63/1441 713/168 |
| 2011/0302410 A1* | 12/2011 | Clarke | H04L 9/0872 380/46 |
| 2011/0311053 A1* | 12/2011 | Escott | H04W 12/041 380/272 |
| 2011/0314289 A1* | 12/2011 | Horn | H04W 12/0431 713/168 |
| 2011/0317837 A1* | 12/2011 | Smith | H04L 9/0891 380/259 |
| 2012/0093086 A1 | 4/2012 | Yin et al. | |
| 2012/0106456 A1 | 5/2012 | Jin et al. | |
| 2012/0131653 A1* | 5/2012 | Pasquero | H04L 63/0492 726/6 |
| 2012/0144197 A1* | 6/2012 | Chung | H04L 9/3273 713/169 |
| 2012/0151089 A1 | 6/2012 | Ponmudi | H04L 63/205 709/237 |
| 2012/0158839 A1 | 6/2012 | Hassan | H04W 8/005 709/204 |
| 2012/0159159 A1* | 6/2012 | Messerges | H04L 9/321 713/168 |
| 2012/0159167 A1* | 6/2012 | Lee | H04W 12/069 713/168 |
| 2012/0163597 A1 | 6/2012 | Pan | H04L 53/06 380/255 |
| 2012/0166671 A1* | 6/2012 | Qi | H04L 45/64 709/236 |
| 2012/0173875 A1 | 7/2012 | Mahidhara et al. | |
| 2012/0182884 A1* | 7/2012 | Pyatkovskiy | H04L 43/028 370/250 |
| 2012/0198228 A1* | 8/2012 | Oberheide | H04L 63/126 713/155 |
| 2012/0221860 A1* | 8/2012 | Hoornaert | G06F 21/34 713/172 |
| 2012/0224507 A1 | 9/2012 | Sun et al. | |
| 2012/0252531 A1 | 10/2012 | King et al. | |
| 2012/0254443 A1 | 10/2012 | Ng et al. | |
| 2012/0276913 A1 | 11/2012 | Lim et al. | |
| 2012/0288092 A1* | 11/2012 | Cakulev | H04L 63/30 380/255 |
| 2012/0322368 A1 | 12/2012 | Desai | H04W 76/14 455/41.1 |
| 2012/0328101 A1* | 12/2012 | Lakshminarayanan | H04L 63/0823 380/258 |

(56) References Cited

U.S. PATENT DOCUMENTS

| | | | |
|---|---|---|---|
| 2013/0007857 A1* | 1/2013 | Li | H04L 63/083 726/6 |
| 2013/0042106 A1 | 2/2013 | Persaud et al. | |
| 2013/0051277 A1 | 2/2013 | Hakola | H04W 76/14 370/254 |
| 2013/0059583 A1 | 3/2013 | Van Phan | H04W 76/14 455/435.1 |
| 2013/0064138 A1 | 3/2013 | Hakola | H04W 8/005 370/255 |
| 2013/0070731 A1* | 3/2013 | Lim | H04W 12/043 370/331 |
| 2013/0080768 A1* | 3/2013 | Lagerway | H04L 9/321 713/176 |
| 2013/0129232 A1* | 5/2013 | Cok | H04N 1/00137 382/224 |
| 2013/0142329 A1 | 6/2013 | Bell et al. | |
| 2013/0151844 A1 | 6/2013 | Messerschmidt | |
| 2013/0157670 A1 | 6/2013 | Koskela | H04W 78/14 455/450 |
| 2013/0157679 A1 | 6/2013 | Van Phan | H04W 76/14 455/452.2 |
| 2013/0159195 A1* | 6/2013 | Kirillin | H04L 63/105 705/71 |
| 2013/0159704 A1* | 6/2013 | Chandrasekaran | G06F 21/57 713/155 |
| 2013/0184024 A1 | 7/2013 | Chen | H04W 76/14 455/509 |
| 2013/0196708 A1* | 8/2013 | Narasimhan | H04L 9/0827 455/525 |
| 2013/0223370 A1* | 8/2013 | Larmo | H04W 76/11 370/329 |
| 2013/0238919 A1* | 9/2013 | Ponmudi | H04W 52/0216 713/323 |
| 2013/0273926 A1 | 10/2013 | Peng | H04B 7/15526 455/450 |
| 2014/0274066 A1 | 9/2014 | Fodor | H04W 24/02 455/437 |
| 2014/0315541 A1 | 10/2014 | Lu | H04W 24/10 466/426.1 |
| 2014/0328310 A1 | 11/2014 | Xu | H04W 72/042 370/329 |

FOREIGN PATENT DOCUMENTS

| | | | | |
|---|---|---|---|---|
| JP | 2006245205 A | 12/2006 | | |
| JP | 2007-336010 A | 12/2007 | | |
| JP | 2009542091 A | 11/2009 | | |
| WO | WO-2006062345 A1 * | 6/2006 | .......... | H04L 9/0841 |
| WO | 2009107474 A1 | 9/2009 | | |
| WO | 2010028690 A1 | 9/2010 | | |
| WO | 2010112236 A1 | 10/2010 | | |
| WO | 2011117677 A1 | 9/2011 | | |
| WO | 2011147462 A | 12/2011 | | |
| WO | 2012061993 A1 | 5/2012 | | |
| WO | 2012137633 A1 | 10/2012 | | |

OTHER PUBLICATIONS

International Search Report for PCT Application No. PCT/JP2013/054640, mailed on May 15, 2013.

Decision to Decline the Amendment dated Aug. 7, 2018 issued by the Japanese Patent Office in counterpart application No. 2014-547591.

3GPP, "3rd Generation Partnership Project Technical Specification Group Core Network General Packet Radio Service (GPRS); GPRS Tunnelling Protocol (GTP) access the Gn and GP Interface (Release 1999)", Technical Specification, 3GPP TS 29.060, V9.19.0, Mar. 2004, Cited in the Applicants Specification on p. 28.

British Search under Section 17(5) for GB Application No. 1205803.6, dated on Aug. 17, 2012.

Decision of Refusal dated Aug. 7, 2018 issued by the Japanes Patent Office in counterpart application No. 2014-547591.

3GPP, "3rd Generation Partnership Project Technical Specification Group Radio Access Network; Evolved Universal Terrestrial Access Network (E-UTRAN): S1 Application Protocol (S1AP) (Release 10)", Technical Specification, 3GPP TS 36.413, V10.5.0. Mar. 2012. Cited in the Applications Specification on p. 24.

Communication dated May 14, 2019, from the Japanese Patent Office in counterpart Application No. 2019-208296.

Alf Zugenmaier, "Technology Reports SAE/LTE—The security art to realize", NTT DOCOMO Technical Journal, vol. 17, No. 3, The Telecommunications Association, Oct. 1, 2009, pp. 27-96 (4 pages total).

Intel, "Operator Managed and Operator Assisted D2D", 3GPP TSG-SA WG1 Meeting #57, S1-120063, Feb. 13-17, 2012, total 4 pages.

Communication dated Sep. 10, 2019 from Japanese Patent Office in counterpart JP Application No. 2018-208296.

Japanese Office Communication for JP Application No. 2020-67157 mailed on Aug. 2, 2022 with English Translation.

* cited by examiner

CORE NETWORK, USER EQUIPMENT, AND COMMUNICATION CONTROL METHOD FOR DEVICE TO DEVICE COMMUNICATION

CROSS REFERENCE TO RELATED APPLICATIONS

The present application is a Continuation of U.S. application Ser. No. 16/552,363 filed on Aug. 27, 2019, which is a Continuation of U.S. application Ser. No. 15/840,431 filed on Dec. 13, 2017, which is a Continuation of U.S. application Ser. No. 14/387,822 filed on Sep. 24, 2014, issued as U.S. Pat. No. 9,876,821 on Jan. 23, 2018, which is a National Stage Entry of PCT Application No. PCT/JP2013/054640 filed on Feb. 18, 2013, which claims priority from United Kingdom Patent Application 1205803.8 filed on Mar. 30, 2012, the disclosures of all of which are incorporated herein by reference in their entirety.

TECHNICAL FIELD

The present invention relates to a communications system and to parts and methods thereof. The invention has particular but not exclusive relevance to wireless communications systems and devices thereof operating according to the 3GPP standards or equivalents or derivatives thereof.

BACKGROUND ART

Wireless communications systems enable users of User Equipment (UE) to communicate with other such users via one of a number of base stations and a core network. Typically, the UEs are mobile terminals, such as cellular telephones and the like. In an active or connected state a UE is registered with the network and has a Radio Resource Control (RRC) connection with a base station so that the network knows to which base station (or cell thereof) the UE belongs and can transmit data to and receive data from the UE. The base station (i.e. the serving cell) provides mobility information and security parameters for the user equipment. The UE also establishes a default Evolved Packet System (EPS) Bearer to an endpoint beyond the base station, typically a gateway, in the Enhanced Packet Core (EPC) network, or core network for short. An EPS Bearer defines a transmission path through the network and assigns an IP address to the UE, at which it can be reached by other communication devices, such as another UE. An EPS Bearer also has a set of data transmission characteristics, such as quality of service, data rate and flow control parameters, which are defined by the subscription associated with the UE and are established by the Mobility Management Entity (MME) upon registration of the UE with the network.

The EPS Bearer is thus managed by the MME, which signals to the UE when it needs to activate, modify, or deactivate a particular EPS Bearer. Thus there are always two connections between the UE and the communication network: one for the user data transmitted using the established EPS bearer (also known as the user plane) and another one for managing the EPS Bearer itself (also known as the control plane).

As part of the Long Term Evolution (LTE) of UTRAN (UMTS Terrestrial Radio Access Network) referred to as E-UTRAN, there are plans to introduce a feature of direct device-to-device (D2D) communication when the UE can communicate user data to another UE that is within the transmission range of the first UE without the need to use LTE network resources. This direct communication would result in better utilization of the available resources, especially on the radio interface, where these are limited.

SUMMARY OF INVENTION

Technical Problem

However, the D2D communication has to remain under the network operator's control thus when setting up such direct radio bearers, it is not enough to consider the signalling between the UE and the network but the signalling between E-UTRAN and EPC as well.

Furthermore, a problem with using a D2D communication path is that conventional security procedures cannot be re-used because in this case the user equipment would have to share their security keys with each other in order to be able to encrypt the user data exchanged between them. The inventors have realised that using either user equipment's security key (i.e. the one that is normally used by the base station) to encrypt the D2D user plane data would make it possible for the other user equipment to eavesdrop all communications intended for the user equipment to which that key belongs, not only the direct communications between them. This raises serious privacy and security issues that need to be addressed.

Although, in theory, it might be possible to provide new security parameters by the base station instead of re-using security keys belonging to the user equipment, there is no way to prevent different base stations controlling different groups of user equipment allocating the same security parameters to their groups, which would result in harmful interference in the overlapping region served by these base stations.

It is therefore the object of the invention to provide a mechanism to set up a D2D bearer, which at least alleviates the above problems.

Solution to Problem

In an aspect there is provided a network entity operable to control the setting up of a device to device communications link between first and second user devices, wherein the network entity comprises: means for providing information relating to a radio bearer that is complementary for the first and second user devices and that is used by the first and second user devices to establish radio communications transmitted over the device to device communications link; and means for sending the radio bearer information towards the first and the second user devices.

The network entity might comprise means for providing first bearer configuration data, including a traffic flow template, for the first user device, that includes a destination address for the second user device and preferably for providing second bearer configuration data, including a second traffic flow template, for the second user device, that includes a destination address for the first user device.

The device to device communication link might carry user plane data between the first and second user devices using said traffic flow template.

Information that is provided in common for the first and second user devices might include a bearer identification for the device to device communications link.

The network entity might comprise means for detecting that the first and the second user devices can establish a new user plane communication with each other, and wherein said means for providing is operable, in response to said detecting, to provide the complementary radio bearer information in an "E-RAB Setup Request" message or a "E-RAB Modify Request" message sent to a base station that is associated with at least one of the first and second user devices.

The E-RAB Setup Request message or the E-RAB Modify Request message might include a non-access stratum (NAS) protocol data unit (PDU) comprising a Modify EPS Bearer Context Request or an Activate Dedicated EPS Bearer Request. In this case, the Modify EPS Bearer Context Request or the Activate Dedicated EPS Bearer Request might comprise information relating to the security configuration for the D2D link. In one embodiment, this security configuration may provide a common security base value that each of the user devices can use to cipher their communications to each other.

The information relating to the security configuration might be provided in a GPRS Tunnelling Protocol (GTP) message, such as the "Create PDP Context Request" or the "Create PDP Context Response".

The network entity might be a mobility management entity.

In another aspect there is provided a user device operable to set up a device to device communications link with a second user device, wherein the user device comprises: means for receiving, from a network entity, information relating to a radio bearer that is complementary for the user device and the second user device; means for establishing a device to device communication link with the second user device using said received information; and means for communicating with the second user device using the established device to device communication link.

In yet another aspect there is provided a network entity operable to control the setting up of a device to device communications link between first and second user devices, wherein the network entity comprises: means for providing security information that is common for the first and second user devices and that is used by the first and second user devices to secure communications transmitted over the device to device communication link; and means for sending the common security information towards each of the first and the second user devices. This aspect may be provided separately from, or in combination with, the above aspects.

The network entity might generate the common security information. Alternatively, the network entity might receive the common security information from another network entity. The network entity might also comprise means for encrypting the generated common security information with a key specific to at least one user device. Preferably the network entity will encrypt the common security information with respective keys for each of the first and second user devices.

The network entity might comprise means for providing bearer configuration data, including a traffic flow template, for the first user device, that includes a destination address for the second user device and preferably for providing second bearer configuration data, including a second traffic flow template, for the second user device, that includes a destination address for the first user device. The bearer configuration data might be provided for the first and second user devices using complementary bearer setup or modify messages.

The network entity might comprise means for providing radio bearer information that is complementary for the first and second user devices and that is used by the first and second user device to establish the device to device communication link.

The network entity might also comprise means for detecting that the first and the second user devices can establish a new user plane communication with each other, and wherein said means for providing is operable, in response to said detecting, to provide the common security information in an "E-RAB Setup Request" message sent to a base station that is associated with at least one of the first and second user devices.

The network entity might comprise means for detecting that the first and the second user devices have an established communication link with each other via a communication network; and wherein said providing means is responsive to said detecting, to provide the common security information in an "E-RAB Modify Request" message sent to a base station that is associated with at least one of the first and second user devices.

The network entity might be a mobility management entity. The other network entity might also be a mobility management entity or a home subscriber server.

In a further aspect there is provided a user device operable to set up a device to device communications link with a second user device, wherein the user device comprises: means for receiving, from a network entity, security information that is common for the user device and the second user device; means for establishing a device to device communication link with the second user device; and means for securing communications transmitted over the device to device communication link using the common security information.

The user device might receive encrypted security information and in this case the user device might comprise means for decrypting the received security information with a key specific to the user device.

The user device might also comprise means for receiving radio bearer information that is common for the first and second user devices and that is used by the first and second user devices to establish the device to device communication link.

The user device might receive bearer configuration data, including a traffic flow template that includes a destination address for the second user device.

The device to device communication link might carry user plane data between the user device and the second user device using said traffic flow template.

The invention also provides, for all network entities and user devices disclosed, corresponding methods and computer programs or computer program products for execution on corresponding user equipment or network communications devices.

Advantageous Effects of Invention

According to the present invention, it is possible to at least provide a mechanism to set up a D2D bearer, which at least alleviates the above problems.

BRIEF DESCRIPTION OF DRAWINGS

Embodiments of the invention will now be described, by way of example, with reference to the accompanying drawings, in which.

DESCRIPTION OF EMBODIMENTS

Overview

Figure 1A:
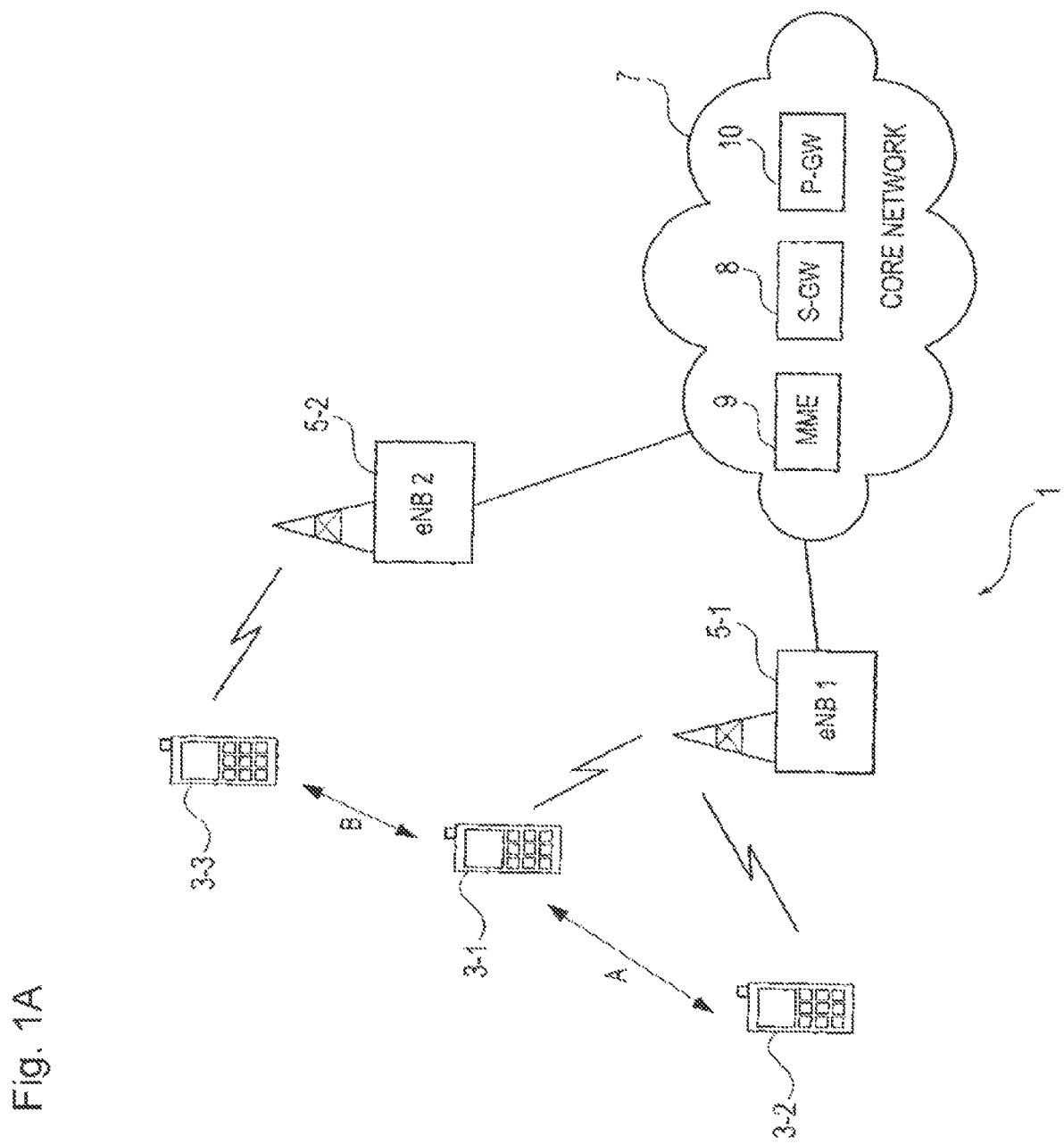
FIG. 1A illustrates schematically a cellular telecommunications system to which embodiments of the invention may be applied.

FIG. 1A schematically illustrates a communications network 1 in which users of mobile telephones (MT) 3-1 to 3-3 can communicate with each other and other users via E-UTRAN base stations 5-1 and 5-2 and core network 7. As those skilled in the art will appreciate, three mobile telephones 3 and two base stations are illustrated in FIG. 1A for illustration purposes and others will be provided in a deployed system. Conventionally, when mobile telephones 3-1 and 3-2 are in communication with each other, user plane data is routed from user equipment 3-1 to base station 5-1, through the core network 7, back to base station 5-1 and to the mobile telephone 3-2 (and similarly for user plane data sent in the opposite direction). Similarly, when mobile telephones 3-1 and 3-3 are in communication with each other, user plane data is conventionally routed from user equipment 3-1 to base station 5-1, through the core network 7, to base station 5-2 and to the mobile telephone 3-3 (and similarly for user plane data sent in the opposite direction).

The communication paths described above ensure that data is transmitted between the mobile telephones 3 in compliance with the relevant subscription parameters and also respecting the service criteria required by the mobile telephones 3 and the security criteria imposed by the network. However, such a conventional arrangement is wasteful of resources in the base stations 5 and in the core network 7 as the two mobile telephones 3 are within radio communications range of each other and a direct user plane communication link can be used instead.

Therefore, in this embodiment, the communications network 1 also supports device-to-device user plane communication between compatible mobile telephones 3. (The control plane data will still be between the mobile telephones 3 and the base station 5/core network 7.) As illustrated in FIG. 1A, such direct communication paths may be set up between mobile telephones 3 served by the same base station, such as the D2D connection denoted "A" between mobile telephones 3-1 and 3-2, and also between mobile telephones 3 served by different base stations 5, such as the D2D connection denoted "B" between mobile telephones 3-1 and 3-3.

There are four main scenarios that the present embodiments address:

1) the two mobile telephones 3 are served by the same base station 5 and a determination that a D2D connection should be established is made during an existing communication session;
2) the two mobile telephones 3 are in the same network 7, but served by different base stations 5, and a determination that a D2D connection should be established is made during an existing communication session; and
3) the two mobile telephones 3 are served by the same base station 5 and a determination that a D2D connection should be established is made during an initial call setup;
4) the two mobile telephones 3 are in the same network 7, but served by different base stations 5, and a determination that a D2D connection should be established is made during an initial call setup.

As will become clear from the following description, in each scenario, once a decision is taken that a connection between two mobile telephones 3 can be made D2D, the core network 7 triggers the necessary signalling (S1AP, RRC) that will allow the establishment of a D2D bearer between the two mobile telephones 3. The D2D bearer will be managed at the network level as an EPS bearer for which a dedicated Traffic Flow Template (TFT) is assigned that allows D2D communications to be made between the two mobile telephones 3. This TFT will ensure that user plane data relating to the direct communications is routed (IP filtered) between the two mobile telephones 3 instead of between the mobile telephones 3 and the core network 7. This ensures that uplink data relating to the D2D link is separately treated by each mobile telephone 3 compared to other uplink data that the mobile telephone 3 has for transmission back to the core network 7 via the base station 5. In order to allow the separate processing and transmission, the uplink data for the D2D link is encoded, segmented and ciphered separately from the other uplink data. As will be described in more detail below, in order to allow for this separate ciphering, common shared security information is provided to the two mobile telephones 3 from which they can generate a common shared security key to encrypt their direct communications.

The mobile telephones 3 will keep their on-going control plane connection with the core network 7 to handle their mobility (i.e. the default EPS bearer), the Packet Data Network (PDN) connection and any other EPS bearers not related to the device to device communication (which will remain connected to the network 7).

Embodiments of the invention use the core network 7, or a device attached to the core network 7, to determine when a communications link between two mobile telephones 3 is suitable for changing to a D2D communications link.

The advantages of the embodiments include that the overload towards the core network 7 (specifically the Serving Gateway and/or the PDN Gateway within the core network 7) is reduced because data can be exchanged directly between the mobile telephones; and because the direct communications between the mobile telephones 3 will be short range communications over a given frequency, will allow extra spectrum usage with multiple devices. The D2D communications will also be secured to prevent eavesdropping either by the network or by other mobile telephones 3.

[EPS Bearer Architecture]

Figure 1B:
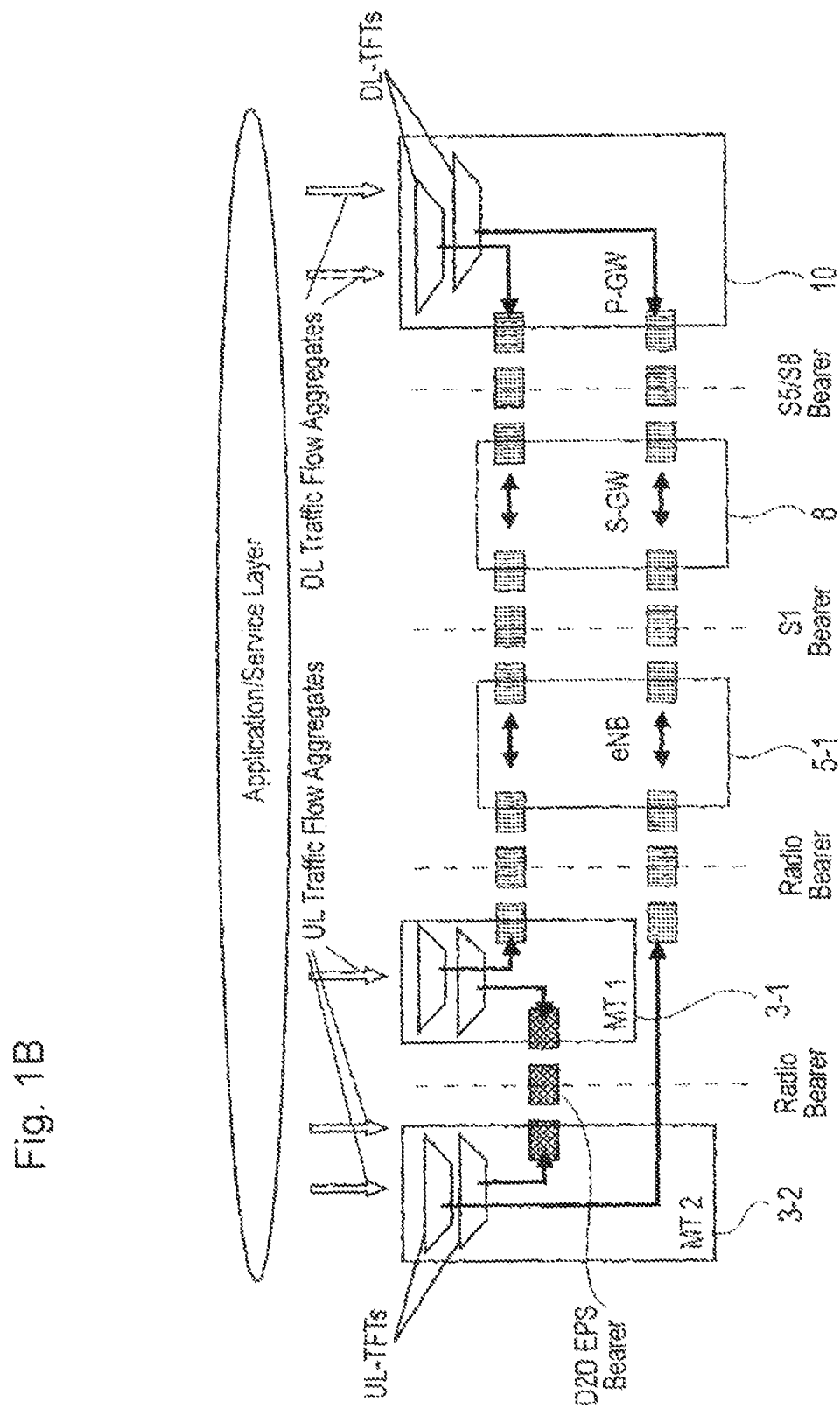
FIG. 1B illustrates an EPS bearer architecture used in the communication system illustrated in FIG. 1A.

Before discussing the above scenarios, it is helpful to set out the architecture of the EPS bearers used to carry the data between the mobile telephones 3 and the base stations 5/core network 7. FIG. 1B gives an overview of the EPS architecture as extended to accommodate the D2D bearer between the mobile telephones 3. Further details can be found in 3GPP TS 23.401 V11.1.0, the contents of which are hereby incorporated by reference. In summary, an EPS bearer is realized by the following elements:

- In the mobile telephone 3, the UL TFT (Uplink Traffic Flow Template) maps a traffic flow aggregate to an EPS bearer in the uplink direction;
- In the PDN GW (Packet Data Network Gateway), the DL TFT (downlink Traffic Flow Template) maps a traffic flow aggregate to an EPS bearer in the downlink direction;
- A radio bearer (as defined in TS 36.300 V11.1.0) is a radio link between two points, with a specific set of associated characteristics, such as quality of service, volume of traffic, frequency allocation, modulation scheme, synchronisation, multiple-input and multiple-output (MIMO) configuration, etc. Radio bearers can be seen as channels offered by Layer 2 to higher layers for the transfer of either user data or control data. When a radio bearer is used for transmitting control data, it is referred to as Signaling Radio Bearer (SRB). The radio bearer transports the packets of an EPS bearer between a mobile telephone and a base station 5. Whenever a mobile telephone 3 is using a service, the service is always associated with a radio bearer specifying the Layer-2 and Physical Layer configuration in order define the associated transmission parameters. However, these associated parameters can be updated anytime during the lifetime of a radio bearer, depending on the current requirements imposed by the two endpoints of communication and the current availability of system resources. If a radio bearer exists, there is a one-to-one mapping between an EPS bearer and this radio bearer;
- An S1 bearer transports the packets of an EPS bearer between a base station 5 and a Serving GW 8;
- An E-RAB (E-UTRAN Radio Access Bearer) refers to the concatenation of an S1 bearer and the corresponding radio bearer, as defined in TS 36.300 V11.1.0.
- An S5/S8 bearer transports the packets of an EPS bearer between the Serving GW 8 and the PDN GW 10;
- The mobile telephone 3 stores a mapping between an uplink packet filter and a radio bearer to create the mapping between a traffic flow aggregate and a radio bearer in the uplink;
- The PDN GW 10 stores a mapping between a downlink packet filter and an S5/S8 bearer to create the mapping between a traffic flow aggregate and an S5/S8 bearer in the downlink;
- The base station 5 stores a one-to-one mapping between a radio bearer and an S1 Bearer to create the mapping between a radio bearer and an S1 bearer in both the uplink and the downlink;
- The Serving GW 8 stores a one-to-one mapping between an S1 Bearer and an S5/S8 bearer to create the mapping between an S1 bearer and an S5/S8 bearer in both the uplink and downlink.
- The PDN GW 10 routes downlink packets to the different EPS bearers based on the downlink packet filters in the TFTs assigned to the EPS bearers in the PDN connection. Similarly, the mobile telephones 3 route uplink packets to the different EPS bearers based on the uplink packet filters in the TFTs assigned to the EPS bearers in the PDN connection.

[Mobility Management Entity]

Figure 2:
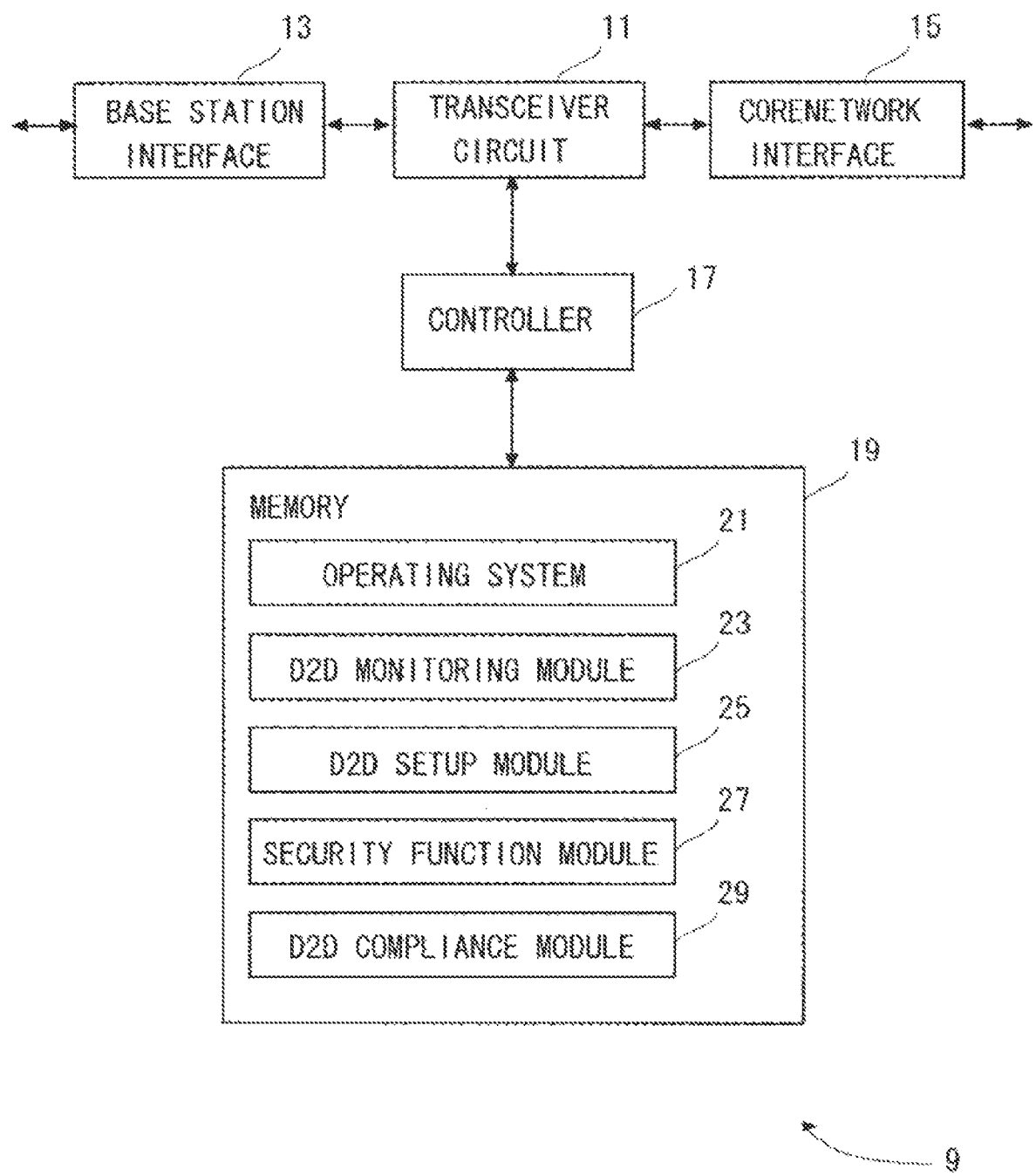
FIG. 2 is a functional block diagram illustrating some of the functionality of a mobility management entity forming part of the system shown in FIG. 1A.

FIG. 2 shows a functional block diagram of the mobility management entity 9 shown in FIG. 1A. As shown, the mobility management entity 9 has a transceiver circuit 11 for transmitting signals to and for receiving signals from the base stations 5 via a base station interface 13, a core network interface 15 for transmitting signals to and for receiving signals from other entities in the core network 7 (or in other core networks operated by other operators), such as the HSS, a gateway, and other MMEs 9. The mobility management entity 9 has a controller 17 to control the operation of the mobility management entity 9. The controller 17 is associated with a memory 19. Although not necessarily shown in FIG. 2, the mobility management entity 9 will of course have all the usual functionality of a conventional mobility management entity and this may be provided by any one or any combination of hardware, software and firmware, as appropriate. Software may be pre-installed in the memory 19 and/or may be downloaded via the communications network 1 or from a removable data storage device (RMD), for example. The controller 17 is configured to control the overall operation of the mobility management entity 9 by, in this example, program instructions or software instructions stored within the memory 19. As shown, these software instructions include, among other things, an operating system 21, a D2D setup module 25 and a security function module 27.

The D2D setup module 25 is operable to control the setting up and modification of D2D connections for mobile telephones 3 served by the mobility management entity 9. After a determination has been made that conditions are met for a mobile telephone 3 to start D2D communications with another mobile telephone 3, the D2D setup module 25 instructs the base station(s) 5 serving the mobile telephones 3 to initiate RRC configuration or reconfiguration (as the case may be).

The security function module 27 generates and provides security information for the mobile telephones 3 to perform secure D2D communication. This security information includes a common shared security base value. The security information is sent to the base station(s) 5 via the transceiver circuit 11 and base station interface 13 for delivery to the mobile telephones 3. In case another mobility management entity 9 is involved, i.e. because one of the UEs 3 is attached via a different core network (not shown), the security function module 27 is operable to negotiate the security information with the corresponding module of the other mobility management entity 9 before providing it to the base station 5.

The program instructions or software instructions stored within the memory 19 includes a D2D monitoring module 23 and a D2D compliance module 29.

[Base Station]

Figure 3:
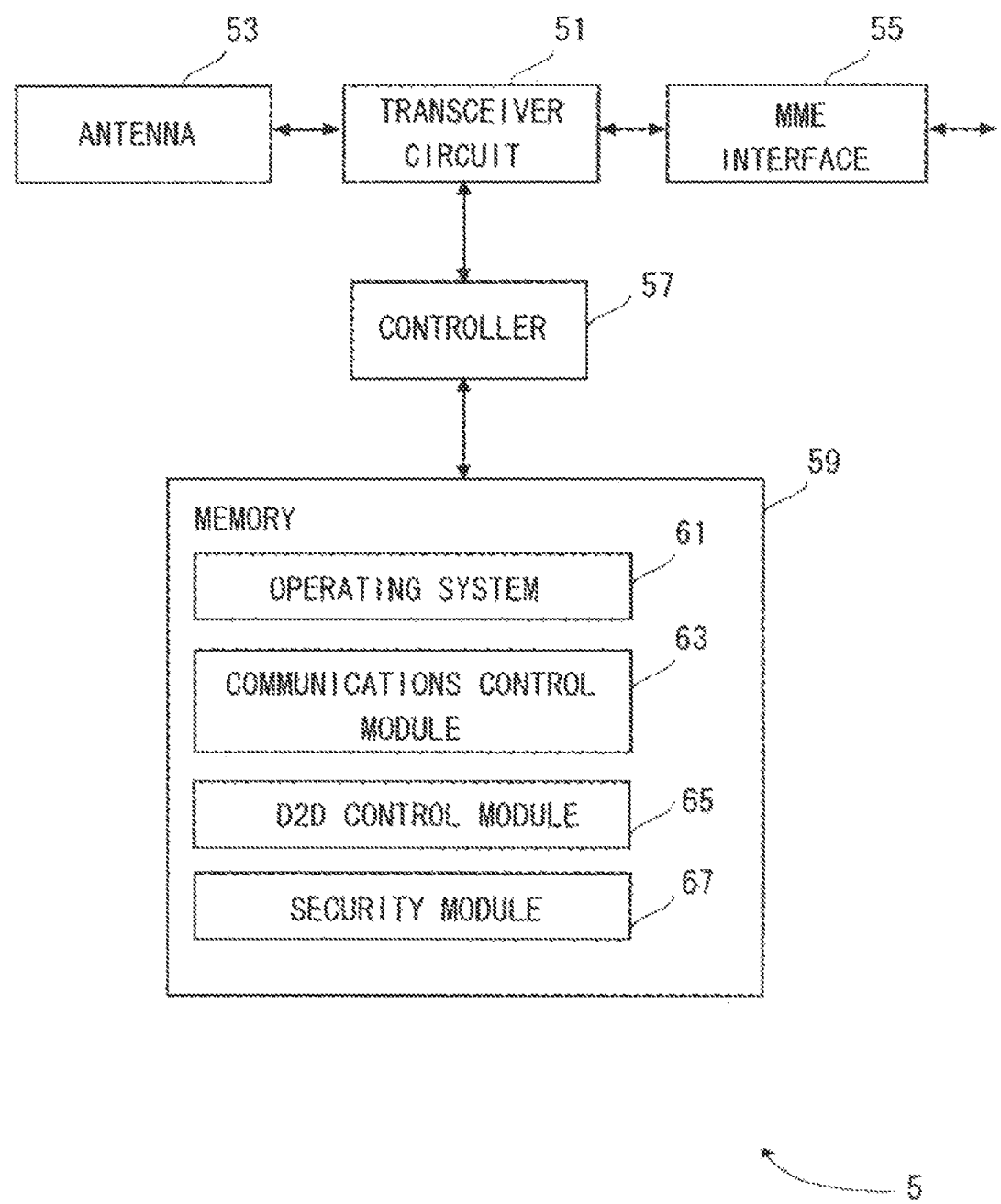
FIG. 3 is a functional block diagram illustrating some of the functionality of a base station forming part of the system shown in FIG. 1A.

FIG. 3 shows a functional block diagram of each of the base stations 5 shown in FIG. 1A. As shown, the base station 5 has a transceiver circuit 51 for transmitting signals to and for receiving signals from the mobile telephones 3 via one or more antenna 53, a core network interface 55 for transmitting signals to and for receiving signals from devices in the core network 7 (such as the mobility management entity 9). The core network interface 55 may be referred to as an MME interface 55. The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, a D2D control module 65 and a security module 67.

The communications control module 63 is operable to handle (e.g. generate, send and receive) control signals for the mobile telephones 3 and other network entities that are connected to the base station 5. The communications control module 63 is also operable to manage RRC connections for the mobile telephones 3 that are attached to the network via this base station 5.

The D2D control module 65 is operable to instruct the communications control module 63 to send the signalling messages required to setup a device-to-device communication link between two mobile telephones 3 based on information received from the mobility management entity 9.

The security module 67 is operable to provide the security parameters necessary for the mobile telephone 3 to communicate with the base station 5 and the security parameters received from the MME 9 that allow the mobile telephone to communicate securely with the other mobile telephone 3 using the D2D communication link.

[Mobile Telephone]

Figure 4:
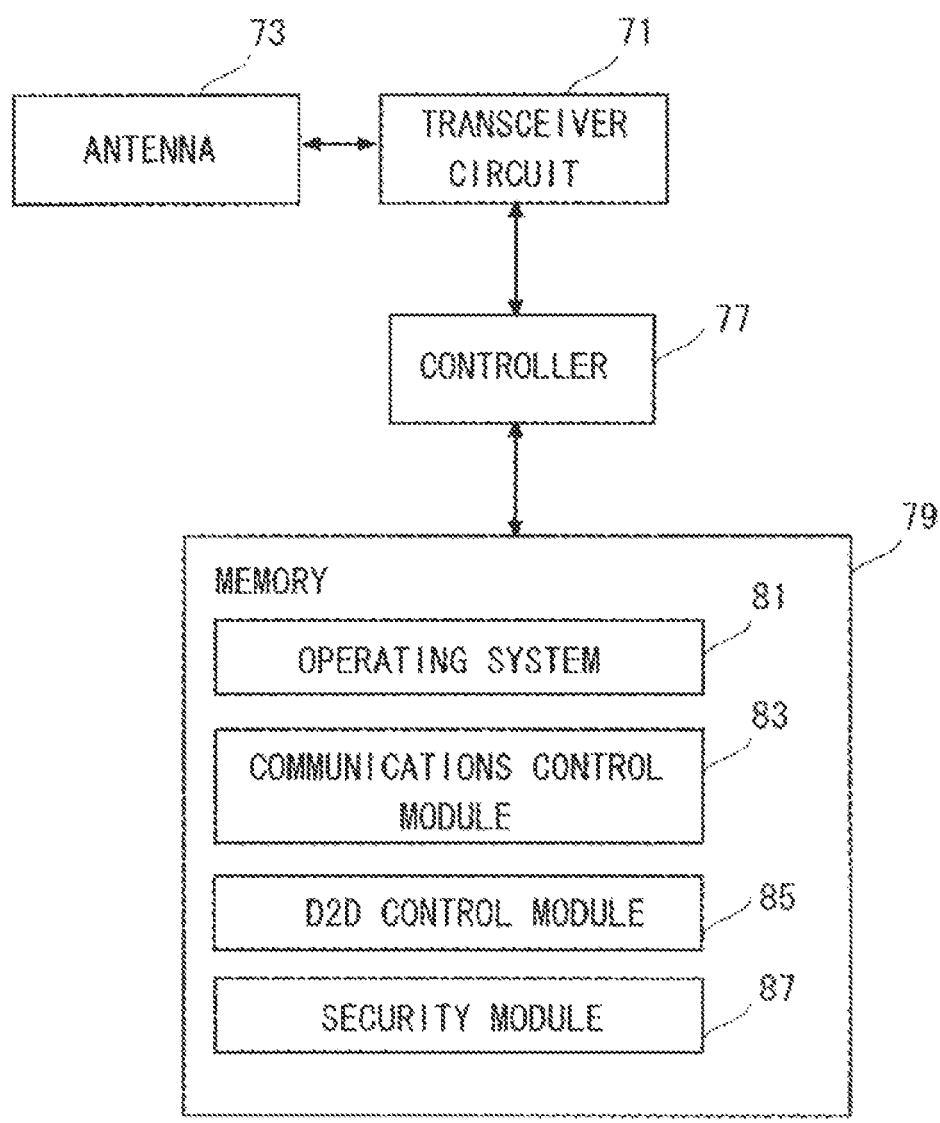
FIG. 4 is a functional block diagram illustrating some of the functionality of a mobile telephone forming part of the system shown in FIG. 1A.

FIG. 4 shows a functional block diagram of the mobile telephone 3 shown in FIG. 1A. As shown, the mobile telephone 3 has a transceiver circuit 71 that is operable to transmit signals to and to receive signals from a base station 5 via one or more antenna 73. The mobile telephone 3 has a controller 77 to control the operation of the mobile telephone 3. The controller 77 is associated with a memory 79 and is coupled to the transceiver circuit 71. Although not necessarily shown in FIG. 4, the mobile telephone 3 will of course have all the usual functionality of a conventional mobile telephone 3 (such as a user interface) and this may be provided by any one or any combination of hardware, software and firmware, as appropriate. Software may be pre-installed in the memory 79 and/or may be downloaded via the telecommunications network or from a removable data storage device (RMD), for example.

The controller 77 is configured to control overall operation of the mobile telephone 3 by, in this example, program instructions or software instructions stored within memory 79. As shown, these software instructions include, among other things, an operating system 81, a communications control module 83, a D2D control module 85, and a security module 87.

The communications control module 83 is operable to handle (e.g. generate, send and receive) control signals for controlling the connections between the mobile telephone 3 and other mobile telephones 3 or the base station 5. The communications control module 83 also controls the separate flows of uplink data and control data that are to be transmitted to the other mobile telephone 3 or to the base station 5.

The D2D control module 85 is operable to instruct the communications control module 83 to set up a device-to-device communication path based on the information received from the mobility management entity 9 via the base station 5.

The security module 87 is operable to receive the security parameters that the mobile telephone 3 is to use when communicating with the different entities—such as the base station 5 or the other mobile telephone 3. When the D2D control module 85 is setting up a D2D path with another mobile telephone 3, the security module 87 uses the security information received from the mobility management entity 9 for the D2D communication link.

[Mobile Telephones Served by the Same Base Station—During Existing Connection]

Figure 5:
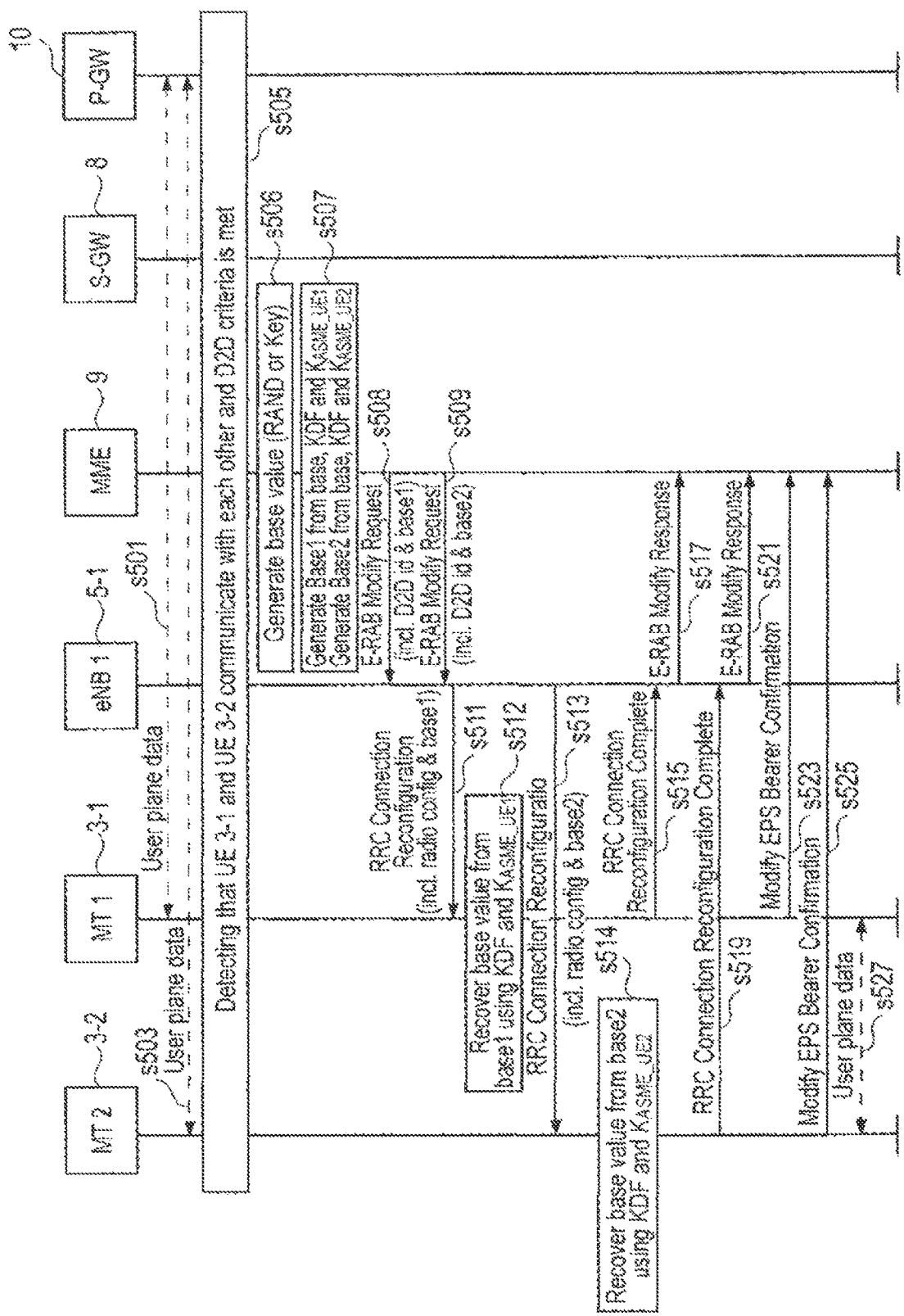
FIG. 5 is a timing diagram illustrating the way in which the mobility management entity controls the setting up of a D2D connection.

A more detailed description will now be given (with reference to FIG. 5) of the scenario discussed above where a D2D communications link is to be established between two mobile telephones 3-1 and 3-2 that already have a communication link established through the core network 7 and that are currently being served by the same base station 5-1.

Initially, the first mobile telephone 3-1 has a user plane data connection with the second mobile telephone 3-2 via the Serving Gateway 8 and the PDN Gateway 10 and the base station 5-1, as shown in steps s501 and s503. In step s505, the core network 7 (or a device external to the core network 7) determines that the two mobile telephones 3-1 and 3-2 are communicating with each other and that they meet the criteria for D2D communication. In response the MME 9 sets up the D2D bearer by establishing a dedicated EPS bearer for which the Traffic Flow Template establishes the mobile telephones 3-1 and 3-2 as the end points for the new EPS bearer. The MME 9 then generates the appropriate security information for the new D2D link. This includes generating, in step s506, a common shared security base value (RAND or Key) for the mobile telephones 3-1 and 3-2; and separately encrypting the base value using a key derivation function (KDF) and keys specific to the two mobile telephones 3-1 and 3-2. Thus, in step s507, the mobility management entity 9 generates two security configuration values: a "base1" value which has been encrypted using a key specific to the first mobile telephone 3-1 ($K_{ASME\_UE1}$), and a "base2" value which has been encrypted using a key specific to the second mobile telephone 3-2 ($K_{ASME\_UE2}$).

In step s508, the MME 9 sends an "E-RAB Modify Request" message to the base station 5-1 for onward transmission to the first mobile telephone 3-1. This E-RAB Modify Request message is to modify the existing EPS bearer that the mobile telephone 3-1 is using in its communications with the second mobile telephone 3-2 (identified by an EPS bearer ID). In particular, this E-RAB Modify Request message identifies the EPS bearer to be modified using the bearer ID and sets the second mobile telephone 3-2 as the destination of the first mobile telephone's 3-1 traffic flow template (TFT) for the D2D communication link. The mobility management entity 9 also includes in this message the D2D bearer configuration and security information for setting up the D2D bearer, including the base1 value calculated in step s507 and the security algorithm to be used for encrypting the user plane data in the D2D connection.

In step s509, the mobility management entity 9 sends a similar "E-RAB Modify Request" message to the base station 5-1 for onward transmission to the second mobile telephone 3-2. This E-RAB Modify Request message is to modify the existing EPS bearer that the second mobile telephone 3-2 is using in its communications with the first mobile telephone 3-1 (identified by the EPS bearer ID). In particular, this E-RAB Modify Request message identifies the EPS bearer to be modified using the EPS bearer ID and includes updated TFT information for the D2D bearer setting mobile telephone 3-1 as the destination of the second mobile telephone's 3-2 Traffic Flow Template. The E-RAB Modify Request message sent in step s509 also includes the D2D bearer configuration and security information for setting up the D2D bearer, including the base2 value calculated in step s507. The E-RAB Modify Request message will also include various other parameters as defined in TS 36.413 V10.5.0, the content of which is hereby incorporated by reference.

In response to receiving the first "E-RAB Modify Request" message sent in step s508, the base station 5-1 generates an "RRC Connection Reconfiguration" message and sends it to the first mobile telephone 3-1 in step s511. The "RRC Connection Reconfiguration" message includes the D2D radio bearer configuration information (such as the radio parameters for the D2D link, including the transmit/receive power, frequency to be used etc.) and security configuration, such as the above described base1 value and ciphering algorithm to be used. The base station 5 may assign the frequency for the D2D connection in a spare frequency that can't be used by the operator due to, for example, limited bandwidth. After receiving this RRC Connection Reconfiguration message, in step s512, the first mobile telephone 3-1 recovers the common shared security base value from the received "base1" value using its $K_{ASME\_UE1}$ key and the key derivation function (KDF).

In response to receiving the second "E-RAB Modify Request" sent in step s509, the base station 5-1 generates another "RRC Connection Reconfiguration" message and sends it to the second mobile telephone 3-2 in step s513. The "RRC Connection Reconfiguration" message includes the D2D radio bearer configuration information and security configuration, such as the above described base2 value and ciphering algorithm to be used. After receiving this RRC Connection Reconfiguration message, in step s514, the second mobile telephone 3-2 recovers the common shared security base value from the "base2" value using its $K_{ASME\_UE2}$ key and the key derivation function (KDF).

After successfully recovering the common shared security base value and reconfiguring the RRC connection, the first mobile telephone 3-1 sends, in step s515, an "RRC Connection Reconfiguration Complete" message back to the base station 5-1, which in turn sends, in step s517, an "E-RAB Modify Response" message to the MME 9, acknowledging receipt of the "E-RAB Modify Request" message.

Similarly, after successfully recovering the common shared security base value and reconfiguring the RRC connection, the second mobile telephone 3-2 sends, in step s519, an "RRC Connection Reconfiguration Complete" message back to the base station 5-1, which in turn sends, in step s521, another "E-RAB Modify Response" message to the MME 9, acknowledging receipt of the "E-RAB Modify Request" message. The base station 5-1 may also release the previous Radio Bearers that were being used for the communications before the reconfigurations.

In step s523, after the first mobile telephone 3-1 has reconfigured its bearer for the D2D connection, the first mobile telephone 3-1 informs the MME 9 that the D2D bearer has been successfully set up by sending a "Modify EPS Bearer Confirmation" message. In step s525, after the second mobile telephone 3-2 has reconfigured its bearer for the D2D connection, the second mobile telephone 3-2 also informs the MME 9 that the D2D bearer has been successfully set up by sending a "Modify EPS Bearer Confirmation" message. The MME 9 will maintain the NAS bearers for billing purposes (as the call is still in progress). If the MME 9 does not receive the E-RAB Modify Response messages back from the base station, then it assumes that the D2D connection has failed and falls back to the previous configuration, where the mobile telephones 3 are communicating via the base station 5.

Finally, in step s527, the first and second mobile telephones 3-1 and 3-2 resume communicating user plane data with each other, except this time via the established D2D connection (labelled "A" in FIG. 1A).

Normally, the mobile telephones 3 generate the security keys used to cipher their communications that are transmitted over the air interface using a security base value that is programmed into the mobile telephone 3 (into the USIM) when the telephone 3 is purchased and which is also known to the network. In accordance with this embodiment, the common shared security base value is sent from the network to each of the mobile telephones 3-1 and 3-2 and is used as (or makes it possible to generate) the common security key that is used for exchanging integrity protected and ciphered messages on the established D2D link between them—instead of using one of the pre-stored security base values. In this way, the mobile telephones 3-1 and 3-2 are effectively provided with a temporary security base value that they should use for their communications over the D2D link. Further, since the common shared security base value has been encrypted using the mobile phone specific keys (i.e. $K_{ASME}$) before being transmitted across the network and over the air interface, no other network entity (or mobile telephone 3) will be able to recover it and use it for eavesdropping on the communications exchanged via the D2D link.

[Mobile Telephones Served by Same Core Network but Different Base Stations—During Existing Connection]

A more detailed description will now be given (with reference to FIG. 6) of the scenario discussed above where a D2D communications link is to be established between two mobile telephones 3-1 and 3-3 that already have a communication link established through the same core network 7 but which are currently being served by different base stations 5-1 and 5-2.

Initially, the first mobile telephone 3-1 has a user plane data connection with the third mobile telephone 3-3 via a Serving Gateway 8 and the first and second base stations 5-1 and 5-2, as shown in steps s601 and s603. In step s605, a decision is made by the core network 7 that the two mobile telephones 3-1 and 3-3 are communicating with each other and that they meet the criteria for D2D communication. In response the MME 9 sets up the D2D bearer by establishing a dedicated EPS bearer for which the Traffic Flow Template establishes the mobile telephones 3-1 and 3-3 as the end points for the new EPS bearer. The MME 9 then generates the appropriate security information for the new D2D link. This includes generating, in step s606, a common shared security base value (RAND or Key) for the mobile telephones 3-1 and 3-3; and separately encrypting the base value using a key derivation function (KDF) and keys specific to the two mobile telephones 3-1 and 3-3. Thus, in step s607, the mobility management entity 9 generates two security configuration values: a "base1" value which has been encrypted using a key specific to the first mobile telephone 3-1 ($K_{ASME\_UE1}$), and a "base3" value which has been encrypted using a key specific to the third mobile telephone 3-3 ($K_{ASME\_UE3}$).

In step s608, the MME 9 sends an "E-RAB Modify Request" message to the first base station 5-1 for onward transmission to the first mobile telephone 3-1. As before, this E-RAB Modify Request message is to modify the existing EPS bearer that the mobile telephone 3-1 is using in its communications with third mobile telephone 3-3. In particular, this E-RAB Modify Request message sets the third mobile telephone 3-3 as the destination of the first mobile telephone's 3-1 traffic flow template (TFT) for the D2D communication link. The mobility management entity 9 also includes in this message the D2D bearer configuration and security information for setting up the D2D bearer, including the base1 value calculated in step s607 and the security algorithm to be used for encrypting the user plane data in the D2D connection. The MME 9 selects the security algorithm for the user plane data, unlike in the current 3GPP standards, which require the base station 5 to define the security algorithm to be used. In step s609, the mobility management entity 9 sends a similar "E-RAB Modify Request" message to the second base station 5-2 for onward transmission to the third mobile telephone 3-3. This E-RAB Modify Request message includes updated TFT information for the D2D bearer setting the first mobile telephone 3-1 as the destination of the third mobile telephone's 3-3 Traffic Flow Template. The E-RAB Modify Request message sent in step s609 also includes the D2D bearer configuration and security information for setting up the D2D bearer, including the base3 value calculated in step s607.

In response to receiving the first "E-RAB Modify Request" message sent in step s608, the first base station 5-1 generates an "RRC Connection Reconfiguration" message and sends it to the first mobile telephone 3-1 in step s611. The "RRC Connection Reconfiguration" message includes the D2D radio bearer configuration information and security configuration, such as the above described base1 value and ciphering algorithm to be used. After receiving this RRC Connection Reconfiguration message, in step s612, the first mobile telephone 3-1 recovers the common shared security base value from the received "base1" value using its $K_{ASME\_UE1}$ key and the key derivation function (KDF).

In response to receiving the "E-RAB Modify Request" sent in step s609, the second base station 5-2 generates an "RRC Connection Reconfiguration" message and sends it to the third mobile telephone 3-3 in step s613. The "RRC Connection Reconfiguration" message includes the D2D radio bearer configuration information and security configuration, such as the above described base3 value and ciphering algorithm to be used. After receiving this RRC Connection Reconfiguration message, in step s614, the third mobile telephone 3-3 recovers the common shared security base value from the "base3" value using its $K_{ASME\_UE3}$ key and the key derivation function (KDF).

After successfully recovering the common shared security base value and reconfiguring the RRC connection, the first mobile telephone 3-1 sends, in step s615, an "RRC Connection Reconfiguration Complete" message back to the first base station 5-1, which in turn sends, in step s617, an "E-RAB Modify Response" message to the MME 9, acknowledging receipt of the "E-RAB Modify" message.

Similarly, after successfully recovering the common shared security base value and reconfiguring the RRC connection, the third mobile telephone 3-3 sends, in step s619, an "RRC Connection Reconfiguration Complete" message back to the second base station 5-2, which in turn sends, in step s621, an "E-RAB Modify Response" message to the MME 9, acknowledging receipt of the "E-RAB Modify" message. If the MME 9 does not receive the E-RAB Modify Response messages back from the base stations 5, then it assumes that the D2D connection has failed and falls back to the previous configuration, where the mobile telephones 3 are communicating via the base stations 5.

In step s623, after the first mobile telephone 3-1 has reconfigured its bearer for the D2D connection, the first mobile telephone 3-1 informs the MME 9 that the D2D bearer has been successfully set up by sending a "Modify EPS Bearer Confirmation" message. In step s625, after the third mobile telephone 3-3 has reconfigured its bearer for the D2D connection, the third mobile telephone 3-3 also informs the MME 9 that the D2D bearer has been successfully set up by sending a "Modify EPS Bearer Confirmation" message.

Finally, in step s627, the first and third mobile telephones 3-1 and 3-3 resume communicating user plane data with each other, except this time via the established direct D2D connection (labelled "B" in FIG. 1A).

[Mobile Telephones Served by the Same Base Station—at Connection Setup]

Figure 7:
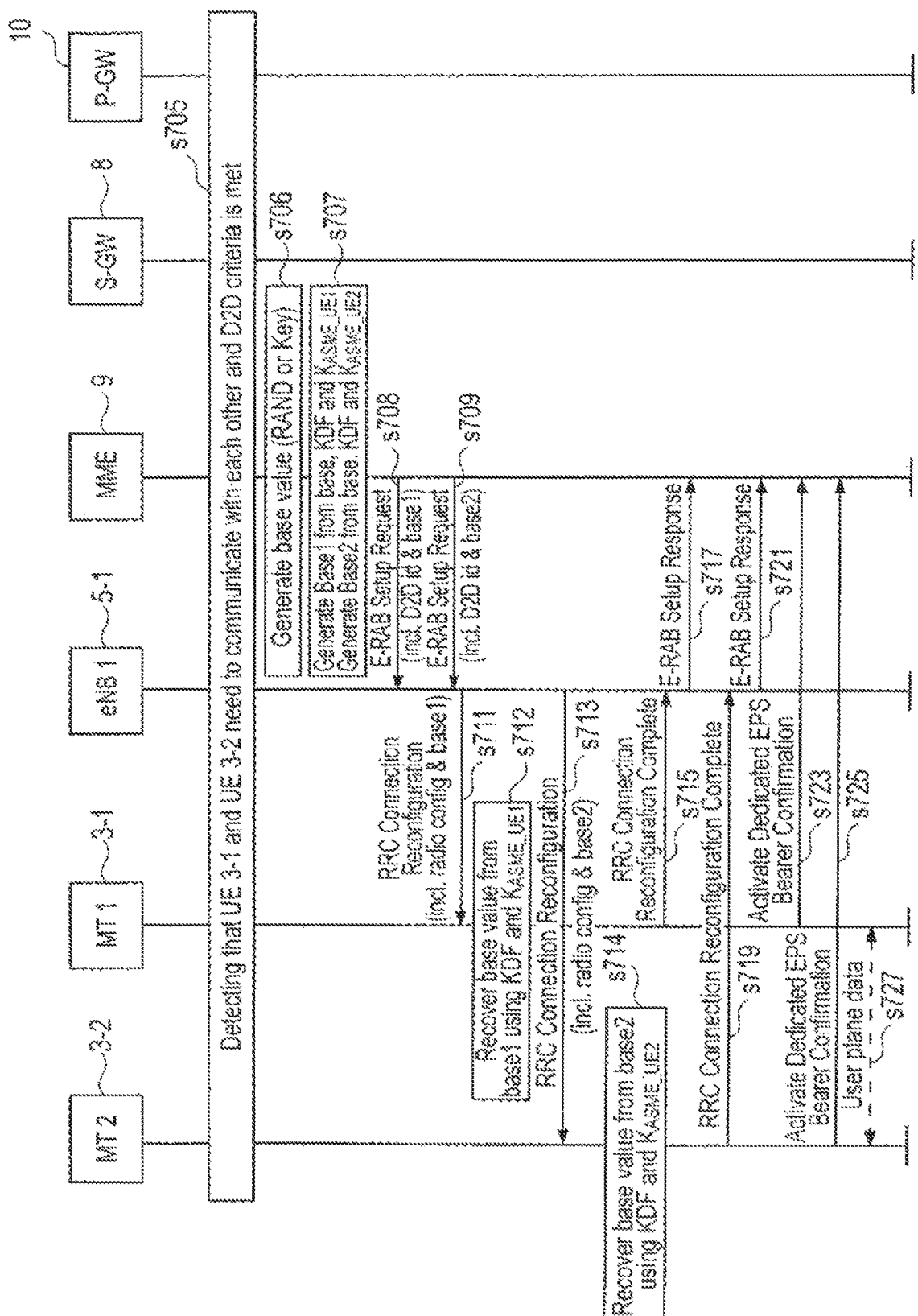
FIG. 7 is a timing diagram illustrating the way in which the mobility management entity controls the setting up of a D2D connection before the mobile telephones exchange user plane data with each other.

A more detailed description will now be given (with reference to FIG. 7) of the scenario discussed above where a D2D communications link is to be established between two mobile telephones 3-1 and 3-2 that are seeking to establish a connection with each other and that are currently being served by the same base station 5-1.

As shown in step s705, the core network 7 (or a device external to the core network 7) determines that the two mobile telephones 3-1 and 3-2 need to communicate with each other and that they meet the criteria for D2D communication. In response the MME 9 sets up the D2D bearer by establishing a dedicated EPS bearer for which the Traffic Flow Template establishes the mobile telephones 3-1 and 3-2 as the end points for the new EPS bearer. The MME 9 then generates the appropriate security information for the new D2D link. This includes generating, in step s706, a common shared security base value (RAND or Key) for the mobile telephones 3-1 and 3-2; and separately encrypting the base value using a key derivation function (KDF) and keys specific to the two mobile telephones 3-1 and 3-2. Thus, in step s707, the mobility management entity 9 generates two security configuration values: a "base1" value which has been encrypted using a key specific to the first mobile telephone 3-1 ($K_{ASME\_UE1}$), and a "base2" value which has been encrypted using a key specific to the second mobile telephone 3-2 ($K_{ASME\_UE2}$).

In step s708, the MME 9 sends an "E-RAB Setup Request" message to the base station 5-1 for onward transmission to the first mobile telephone 3-1. This E-RAB Setup Request message is to setup an EPS bearer that the first mobile telephone 3-1 can use to communicate with the second mobile telephone 3-2. In particular, this E-RAB Setup Request message sets the second mobile telephone 3-2 as the destination of the first mobile telephone's 3-1 traffic flow template (TFT) for the D2D communication link. The mobility management entity 9 also includes in this message the D2D bearer configuration and security information for setting up the D2D bearer, including the base1 value calculated in step s707 and the security algorithm to be used for encrypting the user plane data in the D2D connection. In step s709, the mobility management entity 9 sends a similar "E-RAB Setup Request" message to the base station 5-1 for onward transmission to the second mobile telephone 3-2. This E-RAB Setup Request message includes TFT information for the D2D bearer, setting first mobile telephone 3-1 as the destination of the second mobile telephone's 3-2 Traffic Flow Template. The E-RAB Setup Request message sent in step s709 also includes the D2D bearer configuration and security information for setting up the D2D bearer, including the base2 value calculated in step s707.

In response to receiving the first "E-RAB Setup Request" message sent in step s708, the base station 5-1 generates an "RRC Connection Reconfiguration" message and sends it to the first mobile telephone 3-1 in step s711. The "RRC Connection Reconfiguration" message includes the D2D radio bearer configuration information and security configuration, such as the above described base1 value and ciphering algorithm to be used. After receiving this RRC Connection Reconfiguration message, in step s712, the first mobile telephone 3-1 recovers the common shared security base value from the received "base1" value using its $K_{ASME\_UE1}$ key and the key derivation function (KDF).

In response to receiving the second "E-RAB Modify Request" sent in step s709, the base station 5-1 generates another "RRC Connection Reconfiguration" message and sends it to the second mobile telephone 3-2 in step s713. The "RRC Connection Reconfiguration" message includes the D2D radio bearer configuration information and security configuration, such as the above described base2 value and ciphering algorithm to be used. After receiving this RRC Connection Reconfiguration message, in step s714, the second mobile telephone 3-2 recovers the common shared security base value from the "base2" value using its $K_{ASME\_UE2}$ key and the key derivation function (KDF).

After successfully recovering the common shared security base value and configuring the RRC connection, the first mobile telephone 3-1 sends, in step s715, an "RRC Connection Reconfiguration Complete" message back to the base station 5-1, which in turn sends, in step s717, an "E-RAB Setup Response" message to the MME 9, acknowledging receipt of the "E-RAB Setup Request" message.

Similarly, after successfully recovering the common shared security base value and reconfiguring the RRC connection, the second mobile telephone 3-2 sends, in step s719, an "RRC Connection Reconfiguration Complete" message back to the base station 5-1, which in turn sends, in step s721, another "E-RAB Setup Response" message to the MME 9, acknowledging receipt of the "E-RAB Setup Request" message.

In step s723, after the first mobile telephone 3-1 has configured its bearer for the D2D connection, the first mobile telephone 3-1 sends the MME 9 an "Activate Dedicated EPS Bearer Confirm" message confirming that the D2D EPS bearer is ready to be activated. In step s725, after the second mobile telephone 3-2 has configured its bearer for the D2D connection, the second mobile telephone 3-2 also sends the MME 9 an "Activate Dedicated EPS Bearer Confirm" message confirming that the D2D EPS bearer is ready to be activated.

Finally, in step s727, the first and second mobile telephones 3-1 and 3-2 can start communicating user plane data with each other via the established D2D connection (labelled "A" in FIG. 1A).

[Mobile Telephones Served by Same Core Network but Different Base Stations—at Connection Setup]

A more detailed description will now be given (with reference to FIG. 8) of the scenario discussed above where a D2D communications link is to be established between two mobile telephones 3-1 and 3-3 that want to establish a communication link with each other and which are currently being served by different base stations 5-1 and 5-2.

As shown in step s805, the core network 7 (or a device external to the core network 7) determines that the two mobile telephones 3-1 and 3-3 need to communicate with each other and that they meet the criteria for D2D communication. In response the MME 9 sets up the D2D bearer by establishing a dedicated EPS bearer for which the Traffic Flow Template establishes the mobile telephones 3-1 and 3-3 as the end points for the new EPS bearer. The MME 9 then generates the appropriate security information for the new D2D link. This includes generating, in step s806, a common shared security base value (RAND or Key) for the mobile telephones 3-1 and 3-3; and separately encrypting the base value using a key derivation function (KDF) and keys specific to the two mobile telephones 3-1 and 3-3. Thus, in step s807, the mobility management entity 9 generates two security configuration values: a "base1" value which has been encrypted using a key specific to the first mobile telephone 3-1 ($K_{ASME\_UE1}$), and a "base3" value which has been encrypted using a key specific to the third mobile telephone 3-3 ($K_{ASME\_UE3}$).

In step s808, the MME 9 sends an "E-RAB Setup Request" message to the first base station 5-1 for onward transmission to the first mobile telephone 3-1. This E-RAB Setup Request message is to setup an EPS bearer that will allow the first and third mobile telephones 3-1, 3-3 to communicate with each other. This E-RAB Setup Request message sets the third mobile telephone 3-3 as the destination of the first mobile telephone's 3-1 traffic flow template (TFT) for the D2D communication link. The mobility management entity 9 also includes in this message the D2D bearer configuration and security information for setting up the D2D bearer, including the base1 value calculated in step s807 and the security algorithm to be used for encrypting the user plane data in the D2D connection. In step s809, the mobility management entity 9 sends a similar "E-RAB Setup Request" message to the second base station 5-2 for onward transmission to the third mobile telephone 3-3. This E-RAB Setup Request message includes TFT information for the D2D bearer setting the first mobile telephone 3-1 as the destination of the third mobile telephone's 3-3 Traffic Flow Template. The E-RAB Setup Request message sent in step s809 also includes the D2D bearer configuration and security information for setting up the D2D bearer, including the base3 value calculated in step s807.

In response to receiving the first "E-RAB Modify Request" message sent in step s808, the first base station 5-1 generates an "RRC Connection Reconfiguration" message and sends it to the first mobile telephone 3-1 in step s811. The "RRC Connection Reconfiguration" message includes the D2D radio bearer configuration information and security configuration, such as the above described base1 value and ciphering algorithm to be used. After receiving this RRC Connection Reconfiguration message, in step s812, the first mobile telephone 3-1 recovers the common shared security base value from the received "base1" value using its $K_{ASME\_UE1}$ key and the key derivation function (KDF).

In response to receiving the "E-RAB Setup Request" sent in step s809, the second base station 5-2 generates an "RRC Connection Reconfiguration" message and sends it to the third mobile telephone 3-3 in step s813. The "RRC Connection Reconfiguration" message includes the D2D radio bearer configuration information and security configuration, such as the above described base3 value and ciphering algorithm to be used. After receiving this RRC Connection Reconfiguration message, in step s814, the third mobile telephone 3-3 recovers the common shared security base value from the "base3" value using its $K_{ASME\_UE3}$ key and the key derivation function (KDF).

After successfully recovering the common shared security base value and configuring the RRC connection, the first mobile telephone 3-1 sends, in step s815, an "RRC Connection Reconfiguration Complete" message back to the first base station 5-1, which in turn sends, in step s817, an "E-RAB Setup Response" message to the MME 9, acknowledging receipt of the "E-RAB Setup Request" message.

Similarly, after successfully recovering the common shared security base value and configuring the RRC connection, the third mobile telephone 3-3 sends, in step s819, an "RRC Connection Reconfiguration Complete" message back to the second base station 5-2, which in turn sends, in step s821, an "E-RAB Setup Response" message to the MME 9, acknowledging receipt of the "E-RAB Setup Request" message.

In step s823, after the first mobile telephone 3-1 has configured its bearer for the D2D connection, the first mobile telephone 3-1 sends the MME 9 an "Activate Dedicated EPS Bearer Confirm" message confirming that the D2D EPS bearer is ready to be activated. In step s825, after the third mobile telephone 3-2 has configured its bearer for the D2D connection, the third mobile telephone 3-3 also sends the MME 9 an "Activate Dedicated EPS Bearer Confirm" message confirming that the D2D EPS bearer is ready to be activated.

Finally, in step s827, the first and third mobile telephones 3-1 and 3-2 can start communicating user plane data with each other via the established D2D connection (labelled "B" in FIG. 1A).

In conclusion, the MME 9 provides information for the D2D bearer configuration using a dedicated EPS bearer between both mobile telephones (see 3GPP TS 36.413), either in the S1 "E-RAB setup request" message or in the S1 "E-RAB modify request" to the base station 5. These messages will include the following information:

In the first scenario described above, the E-RAB Modify Request message for the first mobile telephone 3-1, i.e. the message transmitted in step s508, may include the following information:
  MME UE1 S1AP ID,
  eNB UE1 S1AP ID,
  E-RAB to be modified list{E-RAB_UE1, E-RAB Level QoS parameters, E-RAB D2D ID,
  E-RAB D2D security info, NAS_PDU_UE1 (Modify EPS bearer context request(updated TFT))}, in which the "updated TFT" parameter specifies TFT_UE1: {destination address=UE2 IP address}.

The D2D radio bearer configuration information and security configuration are included as follows:
  "MME UE1 S1AP ID" identifies the MME 9 for the first mobile telephone 3-1;
  "eNB UE1 S1AP ID" identifies the base station 5-1 for the first mobile telephone 3-1 in order to correctly route the message through the network towards the first mobile telephone 3-1;
  the E-RAB list includes information related to the radio bearer for the first mobile telephone 3-1 ("E-RAB_UE1"), the Quality of Service to be provided on the D2D link ("E-RAB Level QoS parameters"), the identification of the new D2D link ("E-RAB D2D ID"), the security configuration ("E-RAB D2D security info"—which includes the encrypted common base security value), and the non-access stratum (NAS) protocol data unit (PDU) for the first mobile telephone 3-1 ("NAS_PDU_UE1"), which sets the second mobile telephone 3-2 as the destination for the D2D EPS bearer. The NAS PDU also includes the Modify EPS bearer context request, which is to be delivered, via the base station 5-1, to the first mobile telephone 3-1 in order to adjust its operation.

Similarly, the E-RAB Modify Request for the second mobile telephone 3-2, i.e. the message transmitted in step s509, may include the following complementary information:
  MME UE2 S1AP ID,
  eNB UE2 S1AP ID,
  E-RAB to be modified list{E-RAB_UE2, E-RAB Level QoS parameters, E-RAB D2D ID,
  E-RAB D2D security info, NAS_PDU_UE2 (Modify EPS bearer context request(updated TFT))}, in which the "updated TFT" parameter specifies TFT_UE2: {destination address=UE1 IP address}.

The D2D radio bearer configuration information and the security configuration for the second mobile telephone 3-2 is therefore complementary to that provided for the first mobile telephone 3-1. Such complementary radio bearer configuration information can also include, inter alia, information relating to the modulation scheme, MIMO configuration, frequency, and time frequency scheduling.

Therefore, the two E-RAB Modify Requests containing the complementary information are advantageously used to modify the existing bearers and combine them in a single D2D bearer between the first and second mobile telephones 3-1 and 3-2.

Further, in the first scenario described above, the RRC Connection Reconfiguration message for the first mobile telephone 3-1, i.e. the message transmitted in step s511, may include the following information:
  UE-to-UE radio bearer configuration={RBToMod=RBID_UE1, Radio configuration for D2D bearer}, AS Security configuration={Shared parameter, AS CipheringAlgo}), NAS_PDU_UE1

This information includes the details of the radio bearer of the first mobile telephone 3-1 to be modified (RBID_UE1), the radio configuration to be used on the (Uu) interface between the two mobile telephones 3-1 and 3-2, the security configuration for the access stratum (AS Security configuration), which includes, in this example, information related to the shared parameter (i.e. the base1 value) and the ciphering algorithm to be used on the access stratum. The NAS PDU received in the preceding step is also forwarded to the first mobile telephone 3-1 in this message.

Similarly, RRC Connection Reconfiguration message for the second mobile telephone 3-2, i.e. the message transmitted in step s513, may include the following complementary information:
  UE-to-UE radio bearer configuration={RBToMod=RBID_UE2, Radio configuration for D2D bearer}, AS Security configuration={Shared parameter, AS CipheringAlgo}),
  NAS_PDU_UE2

This information includes the details of the radio bearer of the second mobile telephone 3-2 to be modified (RBID_UE2), the radio configuration to be used on the (Uu) interface between the two mobile telephones 3-1 and 3-2, the security configuration for the access stratum (AS Security configuration), which includes, in this example, information related to the shared parameter (i.e the base2 value) and the ciphering algorithm to be used on the access stratum. The NAS PDU received in the preceding step is also forwarded to the second mobile telephone 3-2 in this message.

In the third scenario described above, the E-RAB Setup Request for the first mobile telephone 3-1, i.e. the message transmitted in step s708, may include the following information:

MME UE1 S1AP ID,
eNB UE1 S1AP ID,
E-RAB to be modified list{E-RAB_UE1, E-RAB Level QoS parameters, E-RAB D2D ID,
E-RAB D2D security info, NAS_PDU_UE1 (Activate Dedicated EPS bearer request(created TFT))}, in which the "created TFT" parameter specifies TFT_UE1: {destination address=UE2 address (e.g. IP address)}.

Similarly, the E-RAB Setup Request for the second mobile telephone 3-2, e.g. the message transmitted in step s709, may include the following complementary information:
MME UE2 S1AP ID,
eNB UE2 S1AP ID,
E-RAB to be modified list{E-RAB_UE2, E-RAB Level QoS parameters, E-RAB D2D ID, E-RAB D2D security info, NAS_PDU_UE2 (Activate Dedicated EPS bearer request(created TFT))}, in which the "created TFT" parameter specifies TFT_UE2: {destination address=UE1 IP address (EG IP address)}.

Thus the two E-RAB Setup Requests containing the complementary information create a D2D bearer between the first and second mobile telephones 3-1 and 3-2.

The MME 9 also provides a security vector (security base value) to be used to protect communications using the device-to-device bearer in S1 "E-RAB setup request" or in S1 "E-RAB modify request" and/or ciphering (and/or integrity) algorithm(s). The base station provides, in the RRC-ConnectionConfiguration message, configuration information for the mobile telephones 3 to establish the D2D radio bearer and the security information received from MME 9.

The RRCConnectionReconfiguration message may include a new Information Element IE (as shown below) to configure for the creation/modification of a D2D bearer (or it may reuse DRB-ToAdd Information Element or DRB-ToMod Information Element).

```
New D2D-ToAddMod ::=    SEQUENCE {
    eps-BearerIdentity      INTEGER (0..15)      OPTIONAL,   -- Cond DRB-Setup
    drb-Identity    DRB-Identity,
    pdcp-Config   PDCP-Config        OPTIONAL,              -- Cond PDCP
    rlc-Config    RLC-Config         OPTIONAL,                        -- Cond Setup
    logicalChannelIdentity   INTEGER (3..10)      OPTIONAL,   -- Cond
DRB-Setup
    logicalChannelConfig   LogicalChannelConfig   OPTIONAL,   -- Cond Setup
    ...
}
```

The mobile telephone 3 generates the user plane key from the new security vector received from MME 9 via the base station, its private $K_{ASME}$ key and a new Key Derivation Function thereof. If the D2D radio bearer configuration and security configuration are both complete, the mobile telephone 3 informs the base station and in response the base station releases the previous radio bearer it had with this mobile telephone 3 and informs the MME of completion of the D2D bearer.

The MME 9 synchronizes the completion of the D2D bearer from both mobile telephones 3. For example, if the D2D bearer of the first mobile telephone 3-1 has failed to be set-up while the D2D bearer of second mobile telephone 3-2 was successfully setup, then the MME 9 can recover the infrastructure path communication for the first mobile telephone 3-1.

The MME 9 may provide the D2D security information either in GTP (GPRS Tunnelling Protocol) "Create PDP Context request/response" or "Update PDP Context request/response". In this regard the reader is referred to 3GPP TS 29.060 for further details.

MODIFICATIONS AND ALTERNATIVES

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

Figure 6:
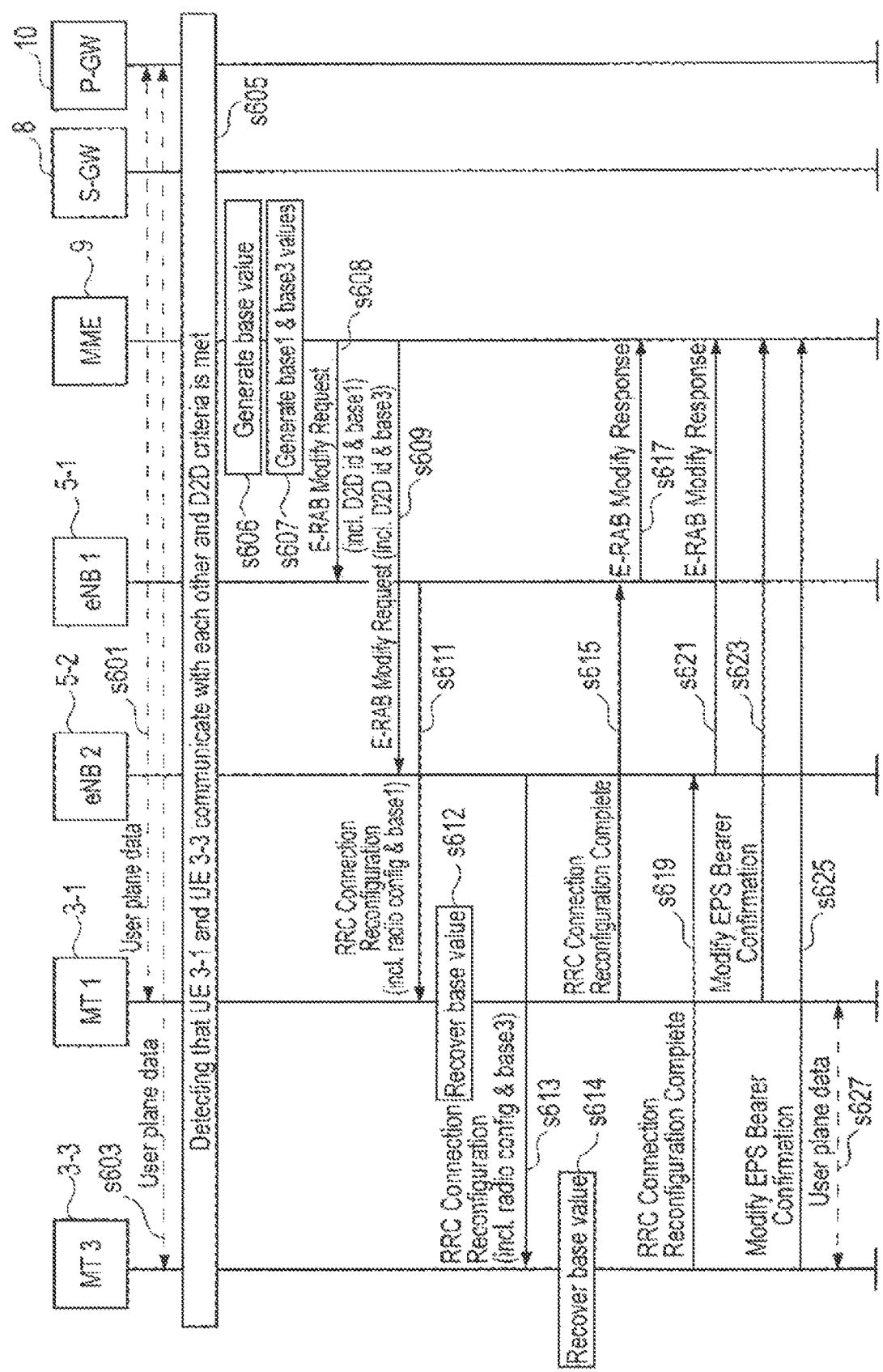
FIG. 6 is a timing diagram illustrating the way in which the mobility management entity controls the setting up of a D2D connection when the mobile telephones are served by different base stations.
Figure 8:
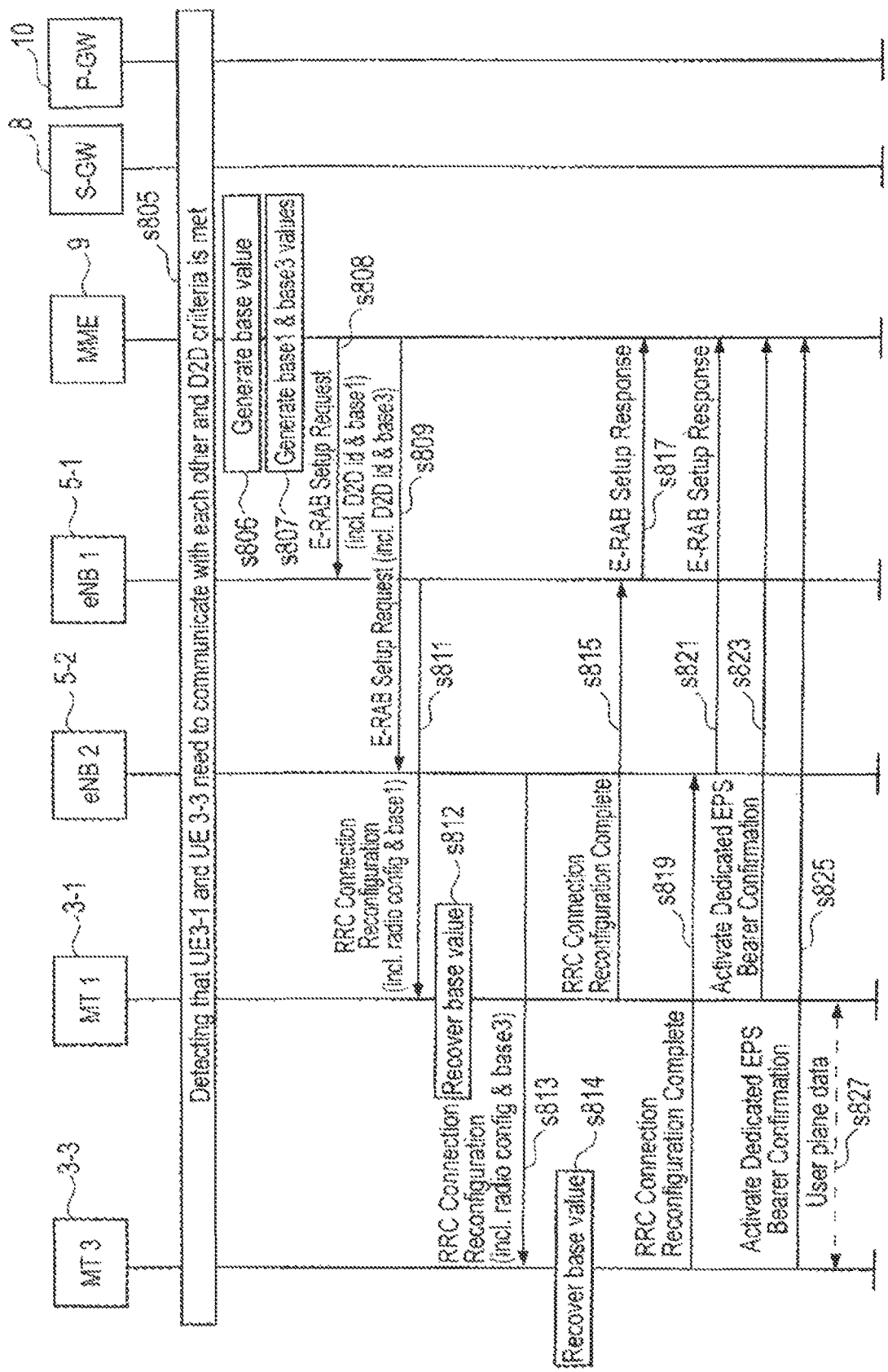
FIG. 8 is a timing diagram illustrating the way in which the mobility management entity controls the setting up of a D2D connection before the mobile telephones exchange user plane data with each other when the mobile telephones are served by different base stations.

In addition to the above scenarios, there is also the scenario where the two mobile telephones 3 that are communicating with each other or that wish to communicate with each other (and which meet the criteria for establishing a D2D connection) are currently attached to different base stations 5 that are connected to different core networks 7. This might happen if, for example, the two mobile telephones are subscribed to different network operators. The operation of such an embodiment is very similar to that illustrated in FIGS. 6 and 8, except that there will also be two MMEs 9 involved in the process. In particular, in this case, the two MMEs 9 will negotiate the base value (or at least negotiate which of the two MMEs will calculate the base value). The first MME 9 will then calculate the base1 value for the mobile telephone associated therewith and the second MME 9 will calculate the base2 value for the mobile telephone associated therewith. The first MME will then send the appropriate EPS Setup or Modify Request message towards its associated mobile telephone and the second MME 9 will send the appropriate EPS Setup or Modify Request message towards its associated mobile telephone. The processing is then as shown in FIG. 6 or 8.

In the above embodiment, two mobile telephones were allowed to establish a D2D connection with each other. As those killed in the art will appreciate, D2D connections may be established between three or more mobile telephones, such that the users of the mobile telephones may be connected together in a conference call setup.

Proximity information that indicates when two or more mobile telephones are within radio range of each other (and hence suitable for a D2D connection) may be provided to the base stations by a node in or connected to the core network or by the mobile telephones themselves.

The above embodiment has described a preferred way of generating shared security information and the preferred way of signalling that security information to the mobile devices that will participate in the D2D communication link. As those skilled in the art will appreciate, other signalling messages may be used to carry the shared security information towards the respective user devices. For example, in the above scenarios, the security information is transmitted between the MME and the base station using the E-RAB Modify Request or the E-RAB Setup Request, and between the base station and the mobile telephone using the RRC Connection Reconfiguration message. It will be appreciated that the security information can be transmitted in any part of the above messages, for example, in the NAS PDU specific for the mobile telephone. It will be further appreciated that the security information can be transmitted using either a Modify EPS Bearer Context Request or an Activate Dedicated EPS Bearer Request, which might be included in the NAS PDU or might be sent separately. Alternatively, the security information might be provided using a different procedure, such as in a GPRS Tunnelling Protocol (GTP) message, for example the "Create PDP Context Request" or the "Create PDP Context Response".

In the above embodiments, the mobile telephones are cellular telephones. Other types of user devices such as, for example, personal digital assistants, laptop computers, web browsers, etc could be used.

Although as described above the mobility management entity generates the common shared security base value, this base value may be generated by another network device, such as the home subscriber server, or a dedicated security base value generation network entity.

Although the setting up of D2D communication paths have been described between mobile telephones within the same communications network, the D2D communication paths according to the invention may be set up between mobile telephones located in different communications networks. In this case, the mobility management entities (and in some cases the base stations) for the respective mobile telephones are also located in different networks.

In the above description, the mobility management entity 9, the base station 5, and the mobile telephones 3 are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above embodiments, a number of software modules were described. As those skilled in the art will appreciate, the software modules may be provided in compiled or un-compiled form and may be supplied to the mobility management entity or to the base station or to the mobile telephone as a signal over a computer network, or on a recording medium. Further, the functionality performed by part or all of this software may be performed using one or more dedicated hardware circuits. However, the use of software modules is preferred as it facilitates the updating of the mobility management entity 9, the base stations 5 and the mobile telephones 3 in order to update their functionalities.

Various other modifications will be apparent to those skilled in the art and will not be described in further detail here.

For example, the present invention can be materialized by a program for causing a computer such as a CPU (Central Processing Unit) to execute the processes shown in FIGS. 5 to 8.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This application is based upon and claims the benefit of priority from United Kingdom Patent Application No. 1205803.8, filed on Mar. 30, 2012, the disclosure of which is incorporated herein in its entirety by reference.

Glossary of 3GPP Terms

D2D—Device to Device
eNB—Evolved NodeB, E-UTRAN base station
EPC—Evolved Packet Core
EPS—Evolved Packet System
E-UTRA—Evolved UMTS Terrestrial Radio Access
E-UTRAN—Evolved UMTS Terrestrial Radio Access Network
HSS—Home Subscriber Server
LTE—Long Term Evolution (of UTRAN)
MME—Mobility Management Entity
NAS—Non-Access-Stratum
OAM—Operation And Maintenance
P-GW—PDN Gateway
(E-)RAB—(EPS-) Radio Access Bearer
RRC—Radio Resource Control
S1-MME—S1 for the control plane
S1-U—S1 for the user plane
S-GW—Serving Gateway
TFT—Traffic Flow Template
UE—User Equipment

INDUSTRIAL APPLICABILITY

The present invention can be applied to a communications system and to parts and methods thereof. The invention can be particularly but not exclusively applied to wireless communications systems and devices thereof operating according to the 3GPP standards or equivalents or derivatives thereof.

REFERENCE SIGNS LIST

1 COMMUNICATIONS NETWORK
3(3-1, 3-2, 3-3) MOBILE TELEPHONE
5(5-1, 5-2) BASE STATION
7 CORE NETWORK
8 SERVING GATEWAY
9 MOBILITY MANAGEMENT ENTITY
10 PACKET DATA NETWORK GATEWAY
11, 51, 71 TRANSCEIVER CIRCUIT
13 BASE STATION INTERFACE
15, 55 CORE NETWORK INTERFACE
17, 57, 77 CONTROLLER
19, 59, 79 MEMORY
21, 61, 81 OPERATING SYSTEM
23 D2D MONITORING MODULE
25 D2D SETUP MODULE
27 SECURITY FUNCTION MODULE
29 D2D COMPLIANCE MODULE 53, 73 ANTENNA
63, 83 COMMUNICATIONS CONTROL MODULE
65, 85 D2D CONTROL MODULE
67, 87 SECURITY MODULE
A, B D2D CONNECTION

The invention claimed is:

1. A first user equipment (UE) comprising:
one or more memories configured to store instructions; and
one or more processors configured to execute the instructions to:
receive, from a first node, a first message including first security information specific to the first UE,
wherein a second UE receives, from a second node, a second message including second security information;
derive a common security key using the first security information,
wherein the second UE derives the common security key using the second security information; and
protect user plane traffic between the first UE and the second UE using the common security key.

2. The first UE according to claim 1, wherein the first UE and the second UE are configured to handle proximity information.

3. The first UE according to claim 1, wherein the one or more processors further configured to execute the instructions to:
establish a direct communication between the first UE and the second UE.

4. A communication method for a first user equipment (UE), the communication method comprising:
receiving, from a first node, a first message including first security information specific to the first UE,
wherein a second UE receives, from a second node, a second message including second security information;
deriving a common security key using the first security information,
wherein the second UE derives the common security key using the second security information; and
protecting user plane traffic between the first UE and the second UE using the common security key.

5. The communication method of claim 4, wherein the first UE and the second UE handle proximity information.

6. The communication method according to claim 4, further comprising:
establishing a direct communication between the first UE and the second UE.

* * * * *